United States Patent
Mejia et al.

(10) Patent No.: US 12,379,059 B2
(45) Date of Patent: Aug. 5, 2025

(54) QUICK CONNECT MANIFOLD FOR FLOWABLE MATERIAL DELIVERY TO A PART-FORMING FIXTURE AND ASSOCIATED SYSTEMS AND METHODS

(71) Applicant: The Boeing Company, Chicago, IL (US)

(72) Inventors: Santiago M. Mejia, Johns Island, SC (US); Samantha Eberhardt, Charleston, SC (US); James R. Kendall, Mount Pleasant, SC (US); Byron J. Autry, Charleston, SC (US); Brian T. Peters, Mount Pleasant, SC (US); David H. Curry, III, Mount Pleasant, SC (US); David M. Raines, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 408 days.

(21) Appl. No.: 17/665,846

(22) Filed: Feb. 7, 2022

(65) Prior Publication Data

US 2023/0250911 A1    Aug. 10, 2023

(51) Int. Cl.
*F16L 41/03* (2006.01)
*G01M 3/28* (2006.01)

(52) U.S. Cl.
CPC .......... *F16L 41/03* (2013.01); *G01M 3/2853* (2013.01)

(58) Field of Classification Search
CPC . F16L 39/02; F16L 39/06; F16L 39/04; F16L 33/28; F16L 37/26; F16L 41/03;
(Continued)

(56) References Cited

U.S. PATENT DOCUMENTS

2014/0367039 A1    12/2014   Gregory et al.
2016/0250813 A1*    9/2016   Stephens ............... B29C 70/544
                                                            425/501
(Continued)

FOREIGN PATENT DOCUMENTS

EP            2623302            8/2013

OTHER PUBLICATIONS

DTSI "Plastic Molding", Industry, retrieved from https://web.archive.org/web/20201022064945/https://www.dsti.com/pdfs/catalogs/DSTI-Industry-Plastic-Molding.pdf, Dated Oct. 22, 2020, Accessed Feb. 4, 2024 (Year: 2024).*

(Continued)

*Primary Examiner* — Larry W Thrower
(74) *Attorney, Agent, or Firm* — Kunzler Bean & Adamson

(57) ABSTRACT

An apparatus, system, and methods for providing flowable material to a part-forming fixture. The apparatus comprising a tool manifold and a fixture manifold. The tool manifold comprises a tool-manifold base and a plurality of tool fittings extending through the tool-manifold base. The fixture manifold comprises a fixture-manifold base and a plurality of fixture fittings extending through the fixture-manifold base. An interface end of each one of the plurality of tool fittings is removably attachable to an interface end of a corresponding one of the plurality of fixture fittings such that, when attached, a seal is created between the tool fittings and the corresponding fixture fitting and flowable material is flowable from each one of the tool fittings into the corresponding one of the fixture fittings.

20 Claims, 17 Drawing Sheets

(58) Field of Classification Search
CPC ... F16L 33/02; F16L 33/04; F16L 3/08; F16L 27/0828; F16L 37/22; F16L 37/50; F16L 39/00; F16L 3/01; B29C 70/32; B29C 70/34; B29C 70/44; B29C 70/54; B29C 37/00; B29C 2035/046; B29C 2035/1666; B29C 70/446; B29C 2043/3605; B29C 70/42; B29C 43/18; B29C 43/10; B29C 43/22; B29C 43/36; B29C 70/40; B65H 2701/33; B65H 2701/341; Y10T 137/8593; Y10T 137/86493; Y10T 137/86863; G01M 3/2853; G01M 3/28; G01M 3/00; G01M 3/2861; F15B 13/02; F15B 13/0871; B23Q 1/70; B23Q 11/103; F27D 7/02; F27D 2007/023; F27D 2007/066; B29L 2031/3076; A22C 7/0069
USPC .................................................. 425/393, 388
See application file for complete search history.

(56) References Cited

U.S. PATENT DOCUMENTS

| | | | | |
|---|---|---|---|---|
| 2017/0219152 | A1* | 8/2017 | Petrou | F16L 27/087 |
| 2019/0195246 | A1* | 6/2019 | Jamison | F15B 13/0814 |
| 2020/0217438 | A1* | 7/2020 | Petrou | F16L 27/087 |
| 2020/0325743 | A1* | 10/2020 | Brezden | E21B 21/12 |
| 2021/0108751 | A1* | 4/2021 | Rogers | F16L 39/00 |
| 2021/0206029 | A1 | 7/2021 | Streeter et al. | |
| 2021/0394262 | A1* | 12/2021 | Tiberghien | F16L 37/56 |
| 2022/0143785 | A1* | 5/2022 | Giles | B25B 5/061 |
| 2022/0212425 | A1 | 7/2022 | Autry et al. | |
| 2023/0041079 | A1* | 2/2023 | Thompson | B05B 15/14 |

OTHER PUBLICATIONS

DSTI "LT Series" Catalog, retrieved from https://www.dsti.com/pdfs/catalogs/DSTI-LT-Series-Catalog.pdf, Published Nov. 9, 2020, Accessed Nov. 14, 2024 (Year: 2024).*

DSTI "GPS Series" Catalog, retrieved from https://www.dsti.com/pdfs/catalogs/DSTI-GPS-Series-Catalog.pdf, Published Feb. 23, 2021, Accessed Nov. 14, 2024 (Year: 2024).*

U.S. Appl. No. 17/556,688 as filed Dec. 20, 2021.

"Food & beverage solutions", Packaging & Processing, retrieved from URL:https://web.archive.org/web/20201022065414/https://www.dsti.com/pdfs/catalogs/DSTI-Packaging-Processing.pdf on Jul. 5, 2023.

"Compact Slip Ring Solutions", retrieved from the Internet: URL:https://www.rotarx.com/wp-content/uploads/B-COMMAND-rotarX-Product-Overview-EN.pdf on Jul. 5, 2023.

Extended European Search Report for EP Application No. 23155177.1 dated Jul. 22, 2023.

* cited by examiner

QUICK CONNECT MANIFOLD FOR FLOWABLE MATERIAL DELIVERY TO A PART-FORMING FIXTURE AND ASSOCIATED SYSTEMS AND METHODS

FIELD

This disclosure relates generally to improving delivery of flowable material to a part-forming fixture, and more particularly to a quick connect manifold for material delivery system.

BACKGROUND

Some part-forming fixtures, such as a mandrel used during a process of fabricating a fuselage of an aircraft using composite materials, have multiple fluidic ports and conduits extending along the fixture. Hoses, which are individually connectable to the ports, are used to deliver heated air and/or air under negative pressure (e.g., a vacuum) to the fixture or a portion of the fixture, during a part-forming process.

Typically, the individual connection between each hose and port is tested, prior to the part-forming process, to ensure the connection quality at each connection (e.g., a quality of the vacuum). Individual hoses are manually connected and disconnected to the necessary ports during the testing and part-forming process, which is a time consuming and labor-intensive process. Additionally, the multiple hoses, which can range in quantity from the tens to hundreds, depending on the application, can become disorganized, create tripping hazards, and/or become unintentionally damaged during the testing or part-forming process. Furthermore, if the fixture requires any rotation, the hoses must be disconnected, prior to rotation of the fixture, and reconnected after rotation of the fixture, which can occur multiple times during a part-forming process.

SUMMARY

The subject matter of the present application provides examples of an apparatus for providing flowable material to a part-forming fixture and associated methods that overcome the above-discussed shortcomings of prior art techniques. Accordingly, in some examples, the apparatuses and methods of the subject matter disclosed herein help provide a quick connect manifold and hose-management system. In other words, the subject matter of the present application has been developed in response to the present state of the art, and in particular, in response to shortcomings of conventional systems.

Disclosed herein is an apparatus for providing flowable material to a part-forming fixture. The apparatus comprises a tool manifold comprising a tool-manifold base and a plurality of tool fittings. The tool-manifold base comprises a tool surface and a fixture-interface surface that is opposite of the tool surface. The plurality of tool fittings extend through the tool-manifold base and each comprises a hose end, extending from the tool surface, and an interface end, extending from the fixture-interface surface. The apparatus also comprises a fixture manifold comprising a fixture-manifold base and a plurality of fixture fittings. The fixture-manifold base comprises a fixture surface and a tool-interface surface that is opposite of the fixture surface. The plurality of fixture fittings extend through the fixture-manifold base and each comprises a hose end, extending from the fixture surface, and an interface end, extending from the tool-interface surface. The interface end of each one of the plurality of tool fittings is removably attachable to the interface end of a corresponding one of the plurality of fixture fittings such that, when attached, a seal is created between the tool fitting and the corresponding fixture fitting and flowable material is flowable from each one of the tool fittings into the corresponding one of the fixture fittings. The preceding subject matter of this paragraph characterizes example 1 of the present disclosure.

The apparatus further comprises a hose management tool coupled with the tool manifold and comprising a plurality of tool hoses. The plurality of tool hoses of the hose management tool are configured to be removably attachable to the hose end of a corresponding one of the plurality of tool fittings. The preceding subject matter of this paragraph characterizes example 2 of the present disclosure, wherein example 2 also includes the subject matter according to example 1, above.

The tool manifold also comprises a rotary union comprises a plurality of outlet ports and a plurality of inlet ports. Each one of the plurality of inlet ports is configured to be removably attachable to a corresponding one of the plurality of tool hoses of the hose management tool. The outlet ports are rotatable relative to the inlet ports. The tool manifold further comprises a rotatable drum attached to the tool surface of the tool-manifold base. The rotatable drum is rotatable relative to the inlet ports of the rotary union but co-rotatable with the outlet ports of the rotary union. The tool manifold additionally comprises a plurality of secondary tool hoses connecting the plurality of outlet ports of the rotary union to the hose end of a corresponding one of the plurality of tool fittings. When the interface end of each one the plurality of tool fittings is attached to the interface end of the corresponding one of the plurality of fixture fittings the rotatable drum and the fixture manifold are co-rotatable. The preceding subject matter of this paragraph characterizes example 3 of the present disclosure, wherein example 3 also includes the subject matter according to of example 2, above.

The fixture comprises a plurality of ports and the hose end of each one of the plurality of fixture fittings is configured to be removably attachable to a corresponding one of the plurality of ports via a fixture hose. The preceding subject matter of this paragraph characterizes example 4 of the present disclosure, wherein example 4 also includes the subject matter according to any of examples 1-3, above.

The apparatus further comprises a clamping mechanism configured to selectively secure the tool manifold and the fixture manifold together after the interface end of each one of the plurality of tool fittings is attached to the interface end of the corresponding one of the plurality of fixture fittings. The preceding subject matter of this paragraph characterizes example 5 of the present disclosure, wherein example 5 also includes the subject matter according to any of examples 1-4, above.

The tool manifold comprises first alignment guides and the fixture manifold comprises second alignment guides. The first alignment guides and second alignment guides configured to aid in the alignment of the interface end of each one of the plurality of tool fittings to the interface end of a corresponding one of the plurality of fixture fittings. The preceding subject matter of this paragraph characterizes example 6 of the present disclosure, wherein example 6 also includes the subject matter according to any of examples 1-5, above.

Also disclosed herein is a system for providing flowable material to a part-forming fixture. The system comprises a tool manifold comprising a tool-manifold base and a plurality of tool fittings. The tool-manifold base comprising a tool surface and a fixture-interface surface that is opposite of the tool surface. The plurality of tool fittings extend through the tool-manifold base and each comprises a hose end, extending from the tool surface, and an interface end, extending from the fixture-interface surface. The system also comprises a hose management tool comprising a plurality of tool hoses and the tool manifold coupled to the hose management tool. The hose end of each one of the plurality of tool fittings is configured to be removably attachable to a corresponding one of the plurality of tool hoses of the hose management tool. The system further comprises a fixture manifold that comprises a fixture-manifold base and a plurality of fixture fittings. The fixture-manifold base comprises a fixture surface and a tool-interface surface that is opposite of the fixture surface. The plurality of fixture fittings extend through the fixture-manifold base and each comprises a hose end, extending from the fixture surface, and an interface end, extending from the tool-interface surface. The system also comprises a fixture comprising a plurality of ports. The fixture manifold is coupled to the fixture and the hose end of each one of the plurality of fixture fittings is configured to be removably attachable to a corresponding one of the plurality of ports via one of a plurality of fixture hoses. The system further comprises at least one flowable-material source that is removably attachable to the plurality of tool hoses and configured to provide flowable material to the plurality of tool hoses. The system also comprises a control system that is communicatively coupled with the at least one flowable-material source to control the flow of the at least one flowable-material source. The interface end of each one of plurality of tool fittings is removably attachable to the interface end of a corresponding one of the plurality of fixture fittings such that, when attached, a seal is created between the tool fitting and the corresponding fixture fitting. The at least one flowable-material source is configured to supply flowable material from at least one of the plurality of tool hoses to at least one of the plurality of ports. The preceding subject matter of this paragraph characterizes example 7 of the present disclosure.

The hose management tool and the tool manifold are movable relative to the fixture manifold. The preceding subject matter of this paragraph characterizes example 8 of the present disclosure, wherein example 8 also includes the subject matter according to example 7, above.

The system further comprises a solenoid that is configured to selectively turn on or off the flowable material from the at least one flowable-material source to one of the plurality of tool fittings. The control system is configured to selectively turn the solenoid on or off. The preceding subject matter of this paragraph characterizes example 9 of the present disclosure, wherein example 9 also includes the subject matter according to any of examples 7-8, above.

The at least one flowable-material source is a vacuum device. The system also includes a pressure transducer configured to measure the vacuum level at one of the plurality of tool fittings. The control system is configured to receive and monitor the vacuum level measured by the pressure transducer. The preceding subject matter of this paragraph characterizes example 10 of the present disclosure, wherein example 10 also includes the subject matter according to any of examples 7-9, above.

The system further comprises a mass flow rate sensor configured to measure the mass flow rate to one of the plurality of tool fittings. The control system is configured to receive and monitor the mass flow rate measured by the mass flow rate sensor. The preceding subject matter of this paragraph characterizes example 11 of the present disclosure, wherein example 11 also includes the subject matter according to any of examples 7-10, above.

The part-forming fixture comprises a part-forming surface and a tooling structure. The tooling structure comprises a center panel and a plurality of arms. The plurality of arms extend from the center panel and are fixed to the part-forming surface. The fixture manifold is fixed to the center panel of the tool structure. The preceding subject matter of this paragraph characterizes example 12 of the present disclosure, wherein example 12 also includes the subject matter according to any of examples 7-11, above.

The plurality of arms comprises a hollow opening. Each one of the plurality of fixture hoses extends from the hose end of the fixture fittings and through one of the plurality of hollow arms to a corresponding one of the plurality of parts on the fixture. The preceding subject matter of this paragraph characterizes example 13 of the present disclosure, wherein example 13 also includes the subject matter according to any of examples 7-12, above.

The fixture is rotatable. The tool manifold and the fixture manifold, when coupled together, co-rotate as the fixture is rotated. The preceding subject matter of this paragraph characterizes example 14 of the present disclosure, wherein example 14 also includes the subject matter according to any of examples 7-13, above.

Further disclosed herein is a method of providing flowable material to a part-forming fixture. The method comprises positioning a hose management tool, comprising a plurality of tool hoses and coupled with a tool manifold, adjacent to a fixture coupled with a fixture manifold. The tool manifold comprises a plurality of tool fittings. At least one of the plurality of tool hoses is removably attached to a corresponding one of the plurality of tool fittings. The fixture manifold comprises a plurality of fixture fittings. Each one of a plurality of fixture hoses is connected to one of the plurality of fixture fittings and to a corresponding one of a plurality of ports on the fixture. The method also comprises connecting the tool manifold to the fixture manifold via engagement of each one of the plurality of tool fittings with a corresponding one of the plurality of fixture fittings such that a seal is created between each tool fitting and the corresponding fixture fitting. The method further comprises supplying flowable material from at least one flowable-material source to the at least one of the plurality of tool hoses of the hose management tool. The preceding subject matter of this paragraph characterizes example 15 of the present disclosure.

The method further comprises loading the fixture into a work cell. The preceding subject matter of this paragraph characterizes example 16 of the present disclosure, wherein example 16 also includes the subject matter according to example 15, above.

The method further comprises clamping together the tool manifold and the fixture manifold after connecting the tool manifold to the fixture manifold. The preceding subject matter of this paragraph characterizes example 17 of the present disclosure, wherein example 17 also includes the subject matter according to any of examples 15-16, above.

The method further comprises performing a vacuum test on the plurality of ports along at least a portion of the fixture. The method also comprises applying materials to the least a portion of the fixture after performing the vacuum test. The preceding subject matter of this paragraph characterizes example 18 of the present disclosure, wherein example 18 also includes the subject matter according to any of examples 15-17, above.

The method also comprises applying materials to at least a portion of the fixture and moving the fixture into an autoclave. The step of positioning the hose management tool adjacent to the fixture comprises positioning the hose management tool adjacent to an input end of the fixture and positioning an output tool adjacent to an output end of the fixture. The step of connecting the tool manifold to the fixture manifold comprises connecting the tool manifold of the hose management tool to the fixture manifold coupled to the input end of the fixture and connecting the output tool to the fixture manifold coupled to the output end of the fixture. The step of supplying flowable material from at least one flowable-material source comprises supplying hot air to the plurality of tool hoses of the hose management tool to heat the materials on at least a portion of the fixture, the hot air flowing through the fixture and exiting from the output tool. The preceding subject matter of this paragraph characterizes example 19 of the present disclosure, wherein example 19 also includes the subject matter according to any of examples 15-18, above.

The method further comprises controlling the flowable material supplied from the at least one flowable-material source via a control system communicatively coupled with the at least one flowable-material source. The preceding subject matter of this paragraph characterizes example 20 of the present disclosure, wherein example 20 also includes the subject matter according to any of examples 15-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

In some examples, the present disclosure provides an apparatus for providing flowable material to a part-forming fixture. The part-forming fixture could be any apparatus or device on which a part is formed that requires the delivery of flowable material to the apparatus or device at some point during the part-forming process. For example, the part-forming fixture may be a mandrel that is used during a composite fuselage fabrication process. Generally, the process of attaching hoses, used to deliver flowable material (i.e., air, gas, or a vacuum (e.g., air at a pressure below atmospheric pressure)), to ports along the part-forming fixture is a time-consuming and labor-intensive process, as each individual hose is independently connected and disconnected to the part-forming fixture during any testing of the part-forming fixture or during the part-forming process. The apparatus of the present disclosure can be used to quickly connect and/or disconnect multiple hoses simultaneously rather than individually connecting and/or disconnecting each hose to the part-forming fixture. In some examples, the hoses can be organized into a hose management system to reduce unintentional damage to and the tripping hazards posed by disordered hoses. Additionally, in some examples, the apparatus has a rotatable joint that enables the apparatus to remain connected to the part-forming fixture while the part-forming fixture is being rotated.

Figure 1:
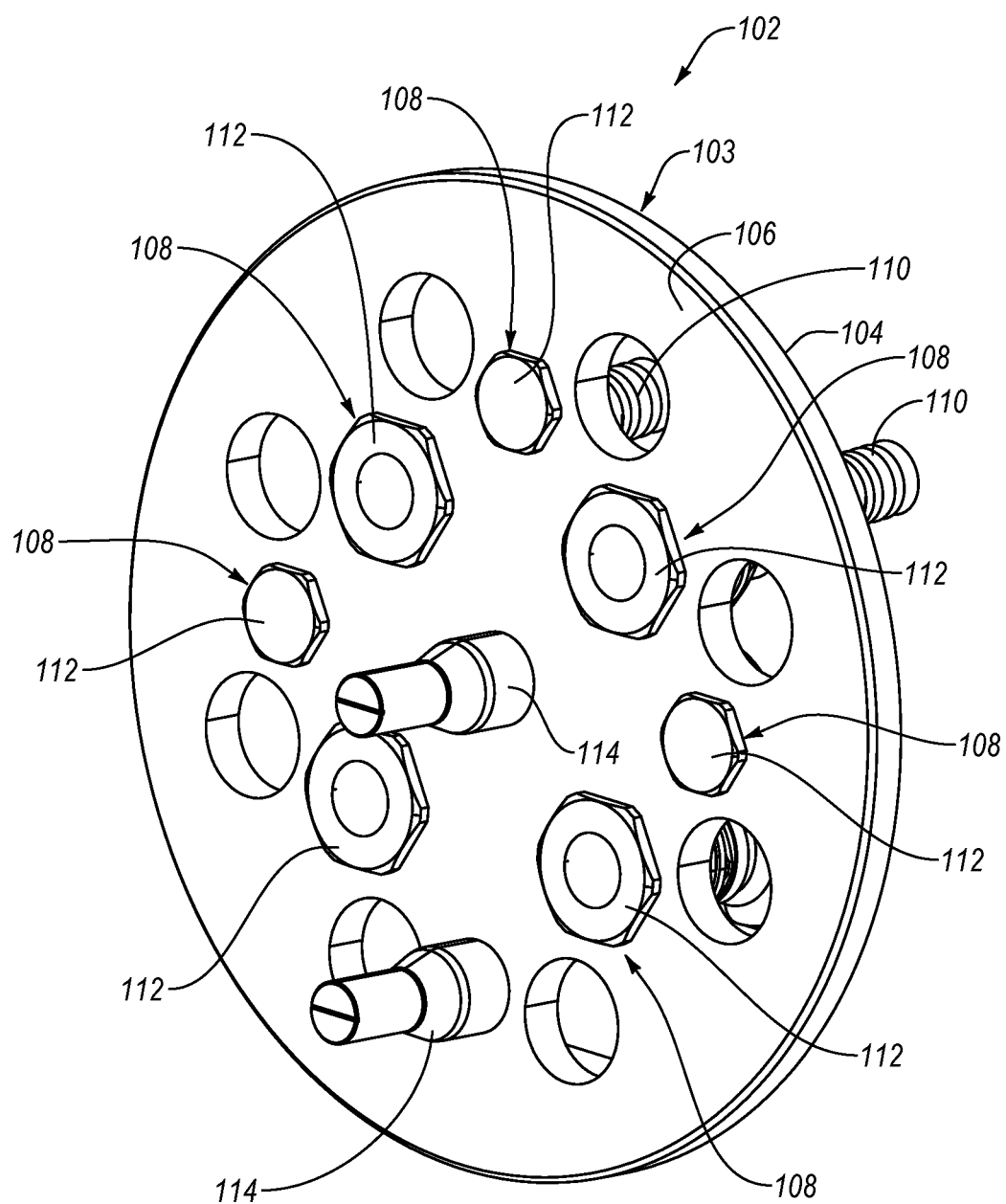
FIG. 1 is a schematic perspective view of a tool manifold, according to one or more examples of the present disclosure.

Referring to FIG. 1, one example of a tool manifold 102 of an apparatus (see, e.g., FIG. 3) is shown. The tool manifold 102 includes a tool-manifold base 103 that has a tool surface 104 and a fixture-interface surface 106, opposite of the tool surface 104. As shown, the tool-manifold base 103 has a circular shape, however, the tool-manifold base 103 could be any of various shapes and/or sizes. A plurality of tool fittings 108 (i.e., hose fittings) extend through the tool-manifold base 103. Each tool fitting 108 has a hose end 110 that extends from the tool surface 104 of the tool-manifold base 103 and an interface end 112 that extends from the fixture-interface surface 106 of the tool-manifold base 103. In one example, the hose end 110 of each of the plurality of tool fittings 108 have the same size and are configured to be removably connectable to hoses (not shown) having the same size. In other examples, the hose ends 110 of the plurality of tool fittings 108 have a variety of sizes and are configured to be removably connectable to hoses with different diameters. For example, some hoses may have a half inch diameter while other hoses have a three-fourths inch diameter. In some examples, the plurality of tool fittings 108 are capable of receiving multiple types of flowable material, such as, pressurized air, hot air and/or depressurized air (e.g., vacuum). In other examples, the plurality of tool fittings 108 are optimized to receive one type of flowable material. The plurality of tool fittings 108 may also be capable of receiving an electric current, such as a current that heats or cools air as it passes through the tool manifold 102. For example, it may be desirable to flow cooler air to an exothermic portion of a part-forming fixture or flow warmer air across a cooler portion of the part-forming fixture.

The tool manifold 102 can, depending on the needs of the fixture, have any number of tool fittings 108 in the plurality of tool fittings 108. In some examples, the number of tool fittings 108 is between two and one hundred. In other examples, the number of tool fittings 108 is between thirty and eighty.

Figure 2A:
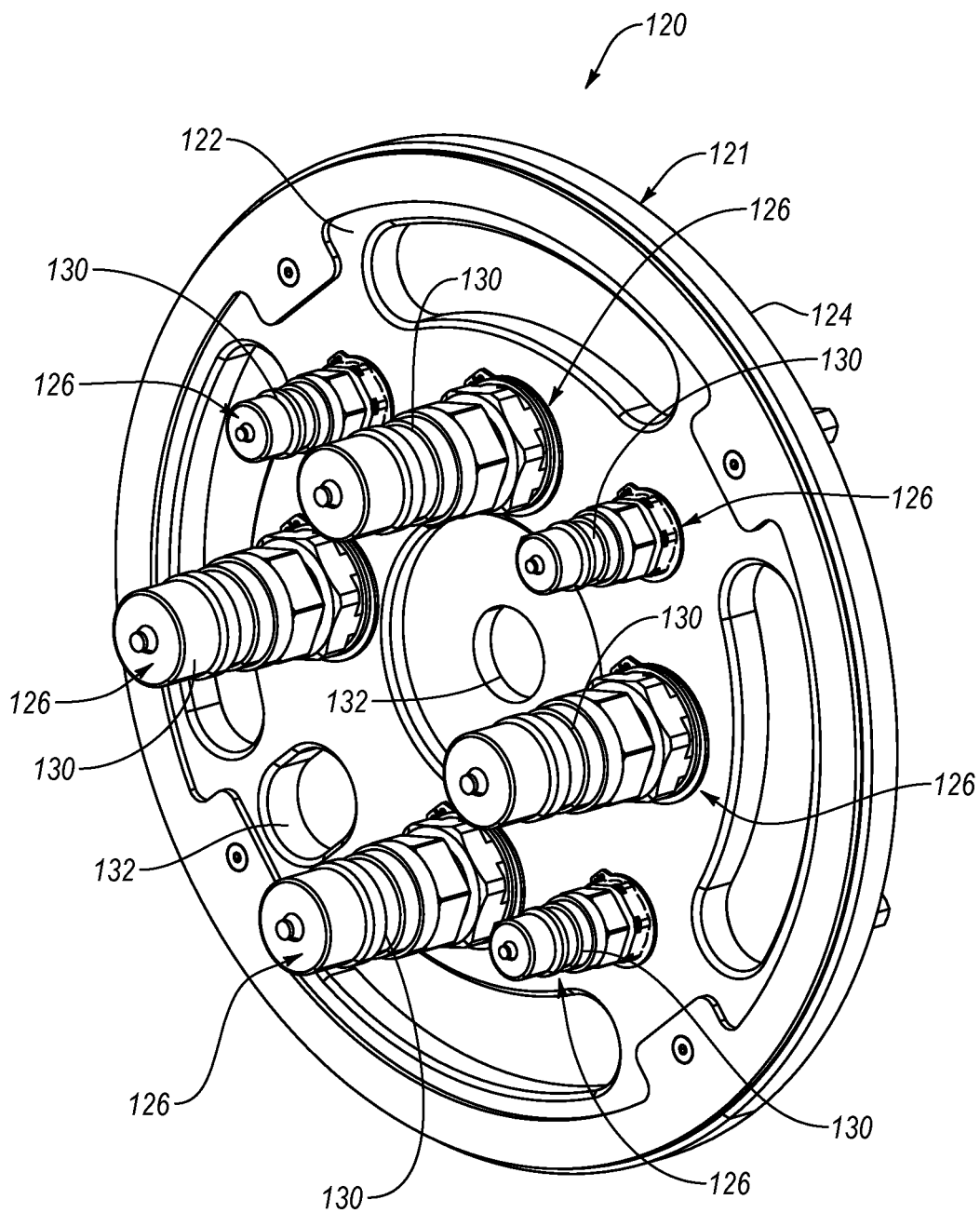
FIG. 2A is a schematic perspective view of a fixture surface of a fixture manifold, according to one or more examples of the present disclosure.
Figure 2B:
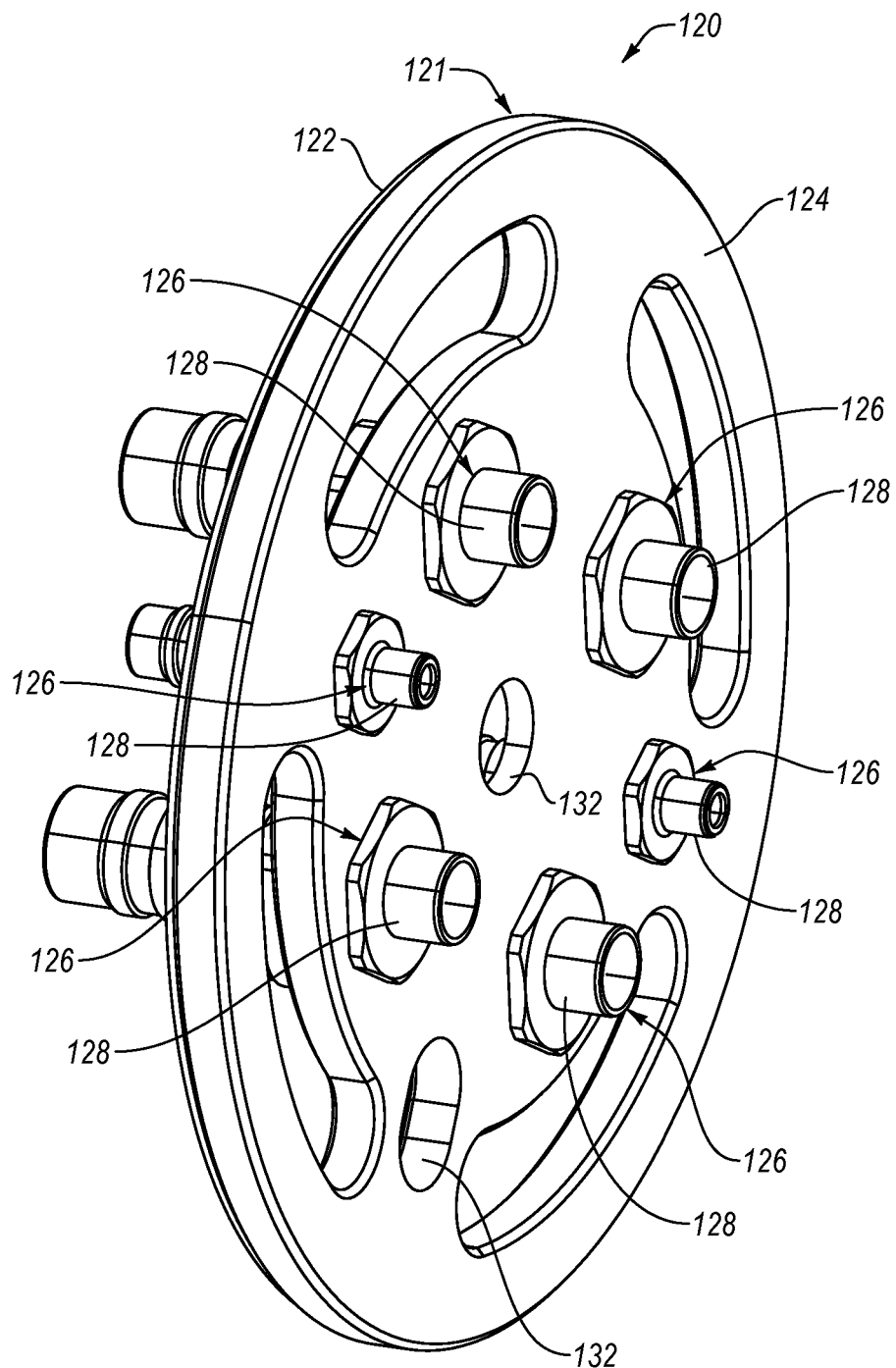
FIG. 2B is a schematic perspective view of a tool-interface surface of the fixture manifold of FIG. 2A, according to one or more examples of the present disclosure.

Referring to FIGS. 2A and 2B, an example of a fixture manifold 120 of the apparatus 100 is shown. The fixture manifold 120 includes a fixture-manifold base 121 that has a fixture surface 122, as shown in FIG. 2A, and a tool-interface surface 124 that is opposite of the fixture surface 122, as shown in FIG. 2B. In the illustrated example, the fixture-manifold base 121 has a circular shape. However, in other examples, the fixture-manifold base 121 could be any of various shapes and/or sizes. Generally, the fixture-manifold base 121 has the same approximate shape as the tool-manifold base 103. A plurality of fixture fittings 126 (i.e., hose fittings) extend through the fixture-manifold base 121. The fixture fittings 126 have a hose end 130 that extends from the fixture surface 122 of the fixture-manifold base 121 and an interface end 128 that extends from the tool-interface surface 124 of the fixture-manifold base 121. In one example, the hose end 130 of the plurality of fixture fittings 126 have the same size and are configured to be removably connectable to hoses (not shown) having the same size. In other examples, the hose ends 130 of the plurality of fixture fittings 126 are sized differently and configured to be removably connectable to hoses with different sized diameters.

Each one of the plurality of tool fittings 108 of the tool manifold 102 corresponds with one of the plurality of fixture fittings 126 of the fixture manifold 120. Accordingly, the number of tool fittings 108 of the tool manifold 102 is equal to the number of fixture fittings 126 of the fixture manifold 120. The interface end 112 of each one of the plurality of tool fittings 108 is removably attachable to the interface end 128 of the corresponding one of the plurality of fixture fittings 126, such that, when attached, a seal is created between the tool fitting 108 and the corresponding fixture fitting 126. In one example, the interface end 112 of the plurality of tool fittings 108 have a male structure while the interface end 128 of the plurality of fixture fittings 126 have a female structure, such that the female end fits inside the male end. In other examples, the interface end 112 of the plurality of tool fittings 108 have a female structure and the interface end 128 of the plurality of fixture fittings 126 have a male structure. The interface end 112 of the tool fittings 108 and/or the interface end 128 of the fixture fittings 126 may have O-rings, either externally or internally, such that, when the tool fittings 108 are attached to the fixture fittings 126, the O-rings help hold the fittings together and prevents leaking between the fittings by creating a seal. In some examples, the plurality of tool fittings 108 and the plurality of fixture fittings 126 are configured to slide together, when attaching, without locking the individual tool fittings 108 to the corresponding fixture fittings 126. In other examples, the plurality of tool fittings 108 and the plurality of fixture fittings 126 have individual locking mechanisms, such as a nut or other fastener, that locks the corresponding tool fittings 108 and fixture fittings 126 together after they are attached.

Figure 3:
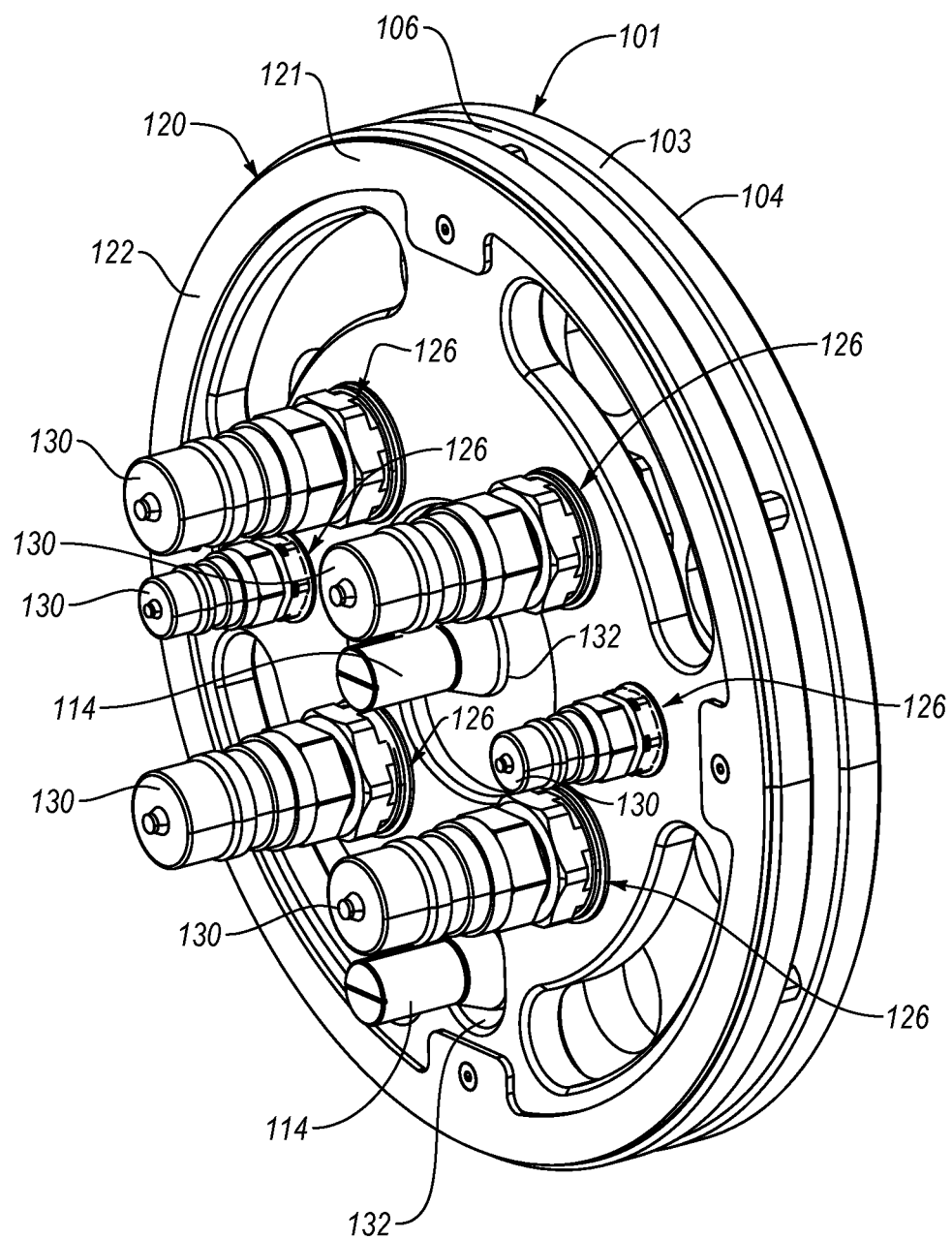
FIG. 3 is a schematic perspective view of a tool manifold coupled with a fixture manifold, according to one or more examples of the present disclosure.

In FIG. 3, the apparatus 100 is shown with the tool manifold 102 attached to the fixture manifold 120. In other words, the interface end 112 of each one of the plurality of tool fittings 108 is attached to the interface end 128 of the corresponding one of the plurality of fixture fittings 126. By attaching each one of the plurality of tool fittings 108 to the corresponding plurality of fixture fittings 126 simultaneously, the tool manifold 102 and the fixture manifold 120 can be quickly connected to each other. Accordingly, any hoses attached to the hose end 110 of the plurality of tool fittings 108 are simultaneously prepared to deliver flowable materials to any ports on a part-forming fixture connected, via a hose to a fixture fitting 126, once the tool manifold 102 and fixture manifold 120 are attached. In other words, multiple hoses can be simultaneously prepared to deliver flowable material to a fixture by attaching the tool manifold 102 to the fixture manifold 120, thereby significantly reducing the time and labor involved with attaching individual hose to individual ports on a fixture.

To aid in the proper alignment of the tool manifold 102 to the fixture manifold 120, alignment guides may be used. In one example, the tool manifold 102 has at least one first alignment guide 114 and the fixture manifold 120 has at least one second alignment guide 132. In some examples, the first alignment guide 114 protrudes out from the fixture-interface surface 106 of the tool manifold 102 and is configured to extend through the second alignment guide 132 of the fixture manifold 120, the second alignment guide 132 configured as an opening through the fixture manifold 120 and sized to fit the first alignment guide 114. Accordingly, as the tool manifold 102 and the fixture manifold 120 are being connected, the first alignment guide 114 is aligned with the corresponding second alignment guide 132, such that the first alignment guides 114 protrudes through the second alignment guides 132 as they are connected. Aligning the first alignment guide 114 with the second alignment guide 132 further aligns the plurality of tool fittings 108 with the corresponding one of the plurality of fixture fittings 126, allowing the tool manifold 102 to be quickly aligned with and connectable to the fixture manifold 120.

Figure 4:
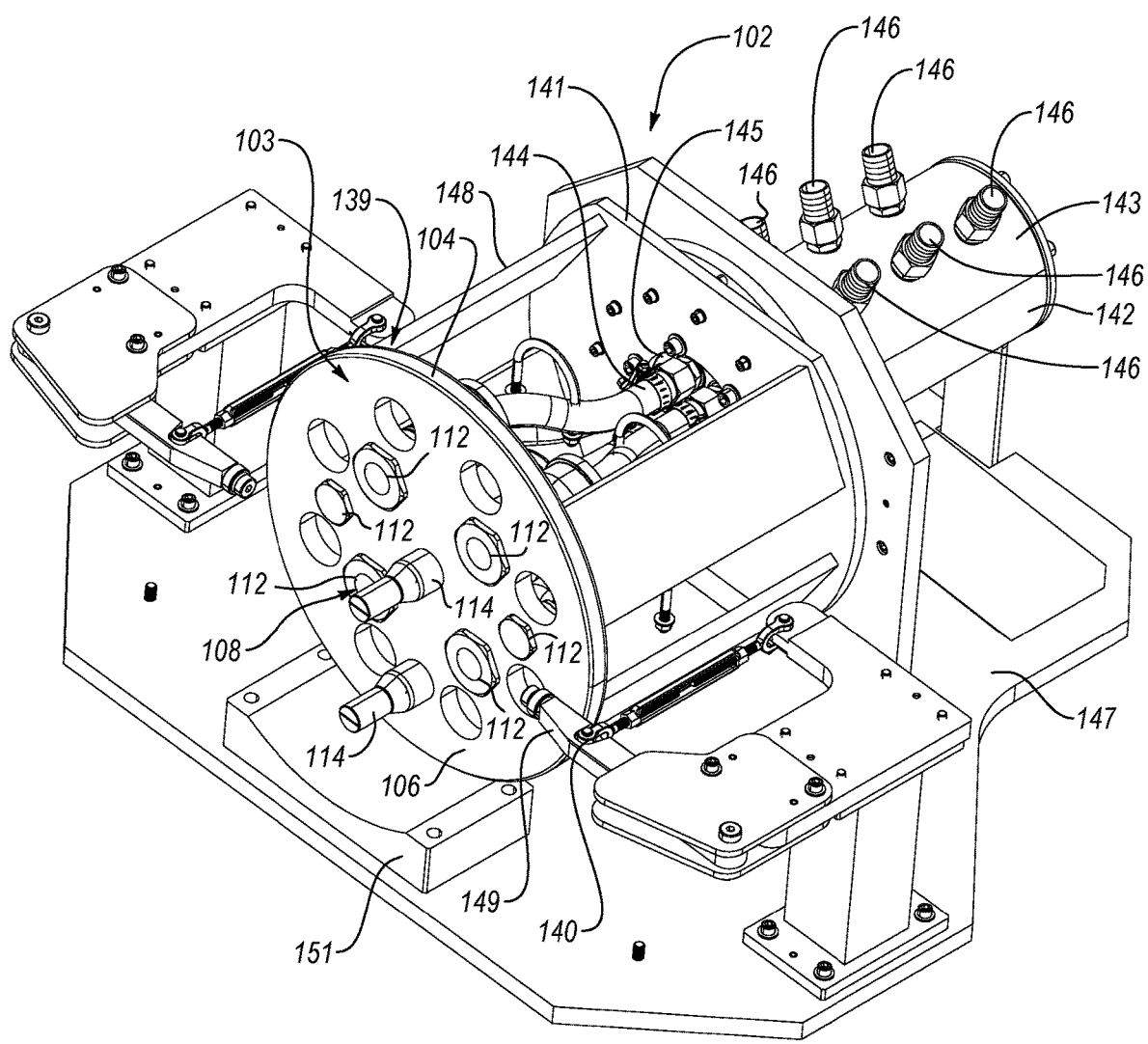
FIG. 4 is a schematic perspective view of a tool manifold, according to one or more examples of the present disclosure.

In some examples, the tool manifold 102 has a rotatable joint which allows the tool manifold 102 to co-rotate with a rotating fixture, when the tool manifold 102 is attached to the fixture manifold 120 on the fixture. As shown in FIG. 4, the rotatable joint of the tool manifold 102 includes a rotary union 142 and a rotatable drum 148. The rotary union 142 has a first section 143 and a second section 145. The first section 143 is coupled to the second section 145, such that the second section 145 is rotatable relative to the first section 143. The first section 143 includes a plurality of inlet ports 146, which are configured to be removably attachable to corresponding tool hoses (not shown). The second section 145 includes a plurality of outlet ports 144, which are connected to the hose end 110 of a corresponding one of the plurality of tool fittings 108 via a corresponding secondary tool hose 150 (e.g., see, FIG. 6). The rotatable drum 148 is attached, at a first end 139, to the tool surface 104 of the tool-manifold base 103 and, at a second end 141, to the second section 145 of the rotary union 142, such that the second section 145 and the rotatable drum 148 are co-rotatable. Accordingly, as the rotatable drum 148 and the second section 145 of the rotary union 142 rotate relative the first section 143 and the tool hoses attached thereto, the secondary tool hoses 150 also rotate with the rotatable drum 148.

In some examples, a support structure 147 may be used to support the tool manifold 102. The rotatable drum 148 is fixed to the support structure 147, such that the support structure 147 and the rotatable drum 148 co-rotate relative to the fixed first section 143 of the rotary union 142. The support structure 147 may further include a tool platform 151 that helps support the tool manifold 102 and/or fixture manifold 120 and keep the rotatable drum 148 properly aligned with the first section 143 of the rotary union 142.

Figure 5:
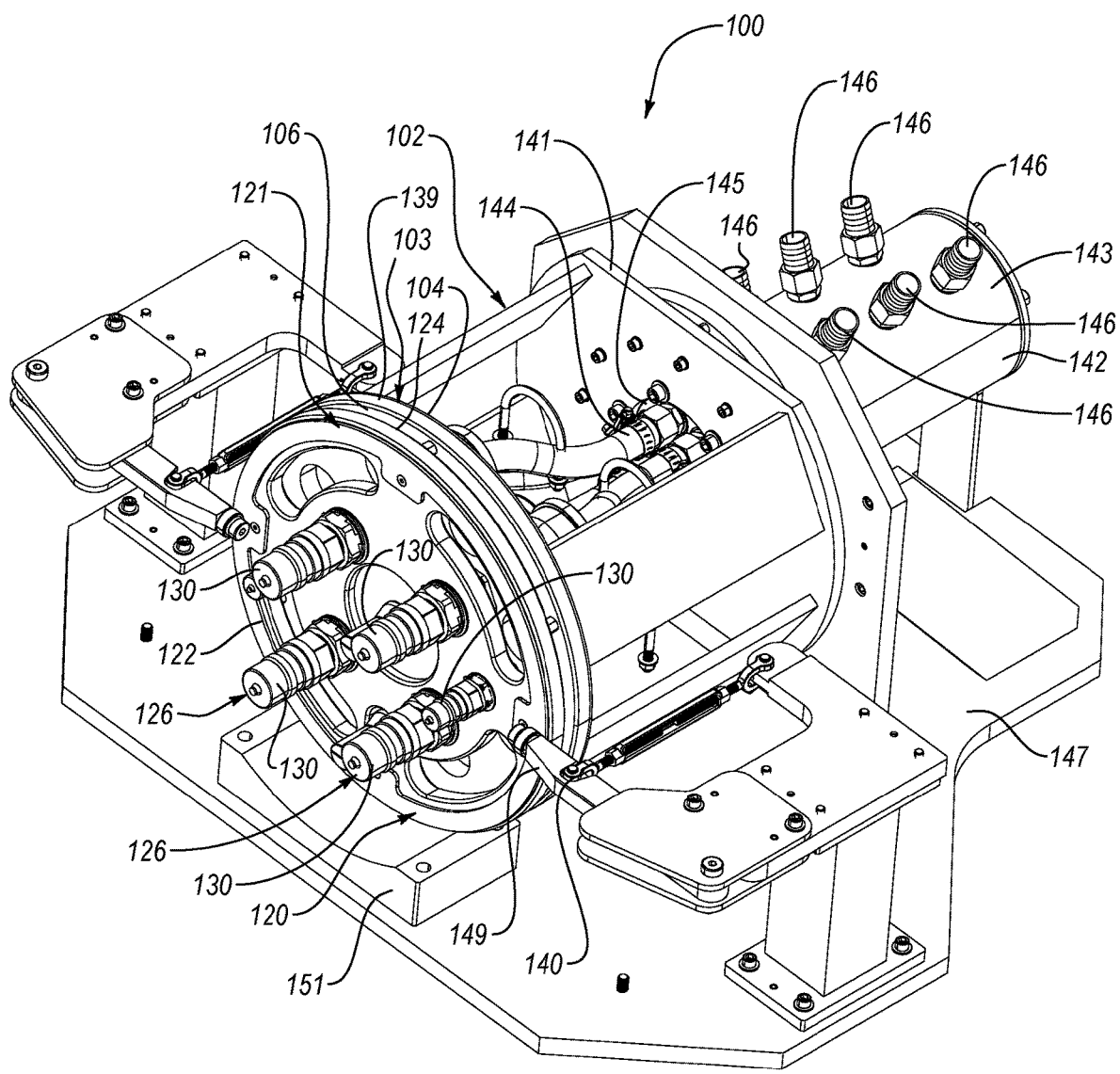
FIG. 5 is a schematic perspective view of a tool manifold coupled with a fixture manifold, according to one or more examples of the present disclosure.

The tool manifold 102 is attachable to the fixture manifold 120, as shown in FIG. 5. Similar to the process described above in reference to FIG. 3, the interface end 112 of each one of the plurality of tool fittings 108 is removably attached to the interface end 128 of the corresponding one of the plurality of fixture fittings 126. In some examples, the apparatus 100 includes a clamping mechanism 140 which is configured to selectively secure the tool manifold 102 and the fixture manifold 120 together after the interface end 112 of each one of the plurality of tool fittings 108 is attached to the interface end 128 of the corresponding one of the plurality of fixture fittings 126.

In one example, the clamping mechanism 140 is attached to the support structure 147 and is configured to prevent the fixture manifold 120 from separating from the tool manifold 102 (such as via a clamping force). For example, the clamping mechanism 140 includes a contact arm 149, which can be movable in some examples, that is configured to contact the fixture surface 122 of the fixture manifold 120 to prevent the fixture manifold 120 from separating from the tool manifold 102. The contact arm 149 of the clamping mechanism 140 can be moved toward the fixture surface 122, via a rotatable wheel or other tightening system, until the contact arm 149 contacts the fixture surface 122 of the fixture manifold 120 with enough clamping force to keep the fixture manifold 120 from separating from the tool manifold 102. Additionally, the contact arm 149 can include a circular cam that rotates along and maintains the clamping force against the fixture manifold 120 as the fixture manifold 120 rotates. In other examples, the clamping mechanism 140 is a separate device that is clamped around the tool manifold 102 and fixture manifold 120, such that the clamping mechanism 140 is in contact with the tool surface 104 of the tool manifold 102 and the fixture surface 122 of the fixture manifold 120. In yet other examples, the clamping mechanism 140 is fixed, at one end, to the tool manifold 102 or the fixture manifold 120 and is capable of clamping another end around the fixture manifold 120 or tool manifold 102, respectively, to selectively secure the tool manifold 102 and the fixture manifold 120. The apparatus 100 may include more than one clamping mechanism 140.

Figure 6:
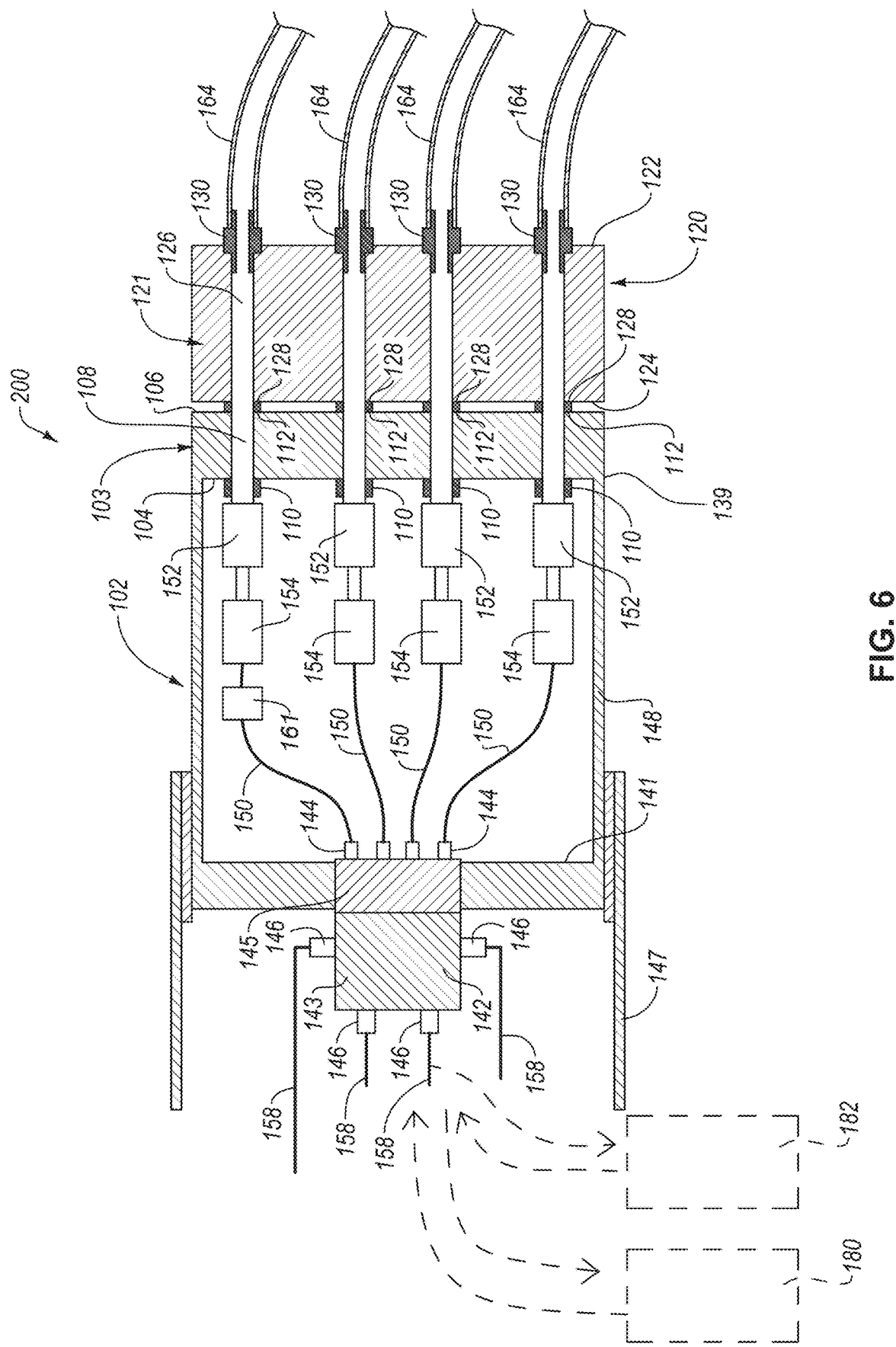
FIG. 6 is a schematic cross-section view of a flowable material delivery system, according to one of more examples of the present disclosure.

In FIG. 6, a cross sectional view of one example of a tool manifold 102 attached to a fixture manifold 120 of a system 200 is shown. A tool hose 158 is attached to each one of the plurality of inlet ports 146. At least one flowable-material source 180 is connected to each one of the tool hoses 158 to provide at least one type of flowable material through the tool manifold 102 and fixture manifold 120 to a plurality of fixture hoses 164. The flowable-material source 180 may supply any of various flowable materials corresponding to the part being manufactured on the part-forming fixture 101.

Figure 7:
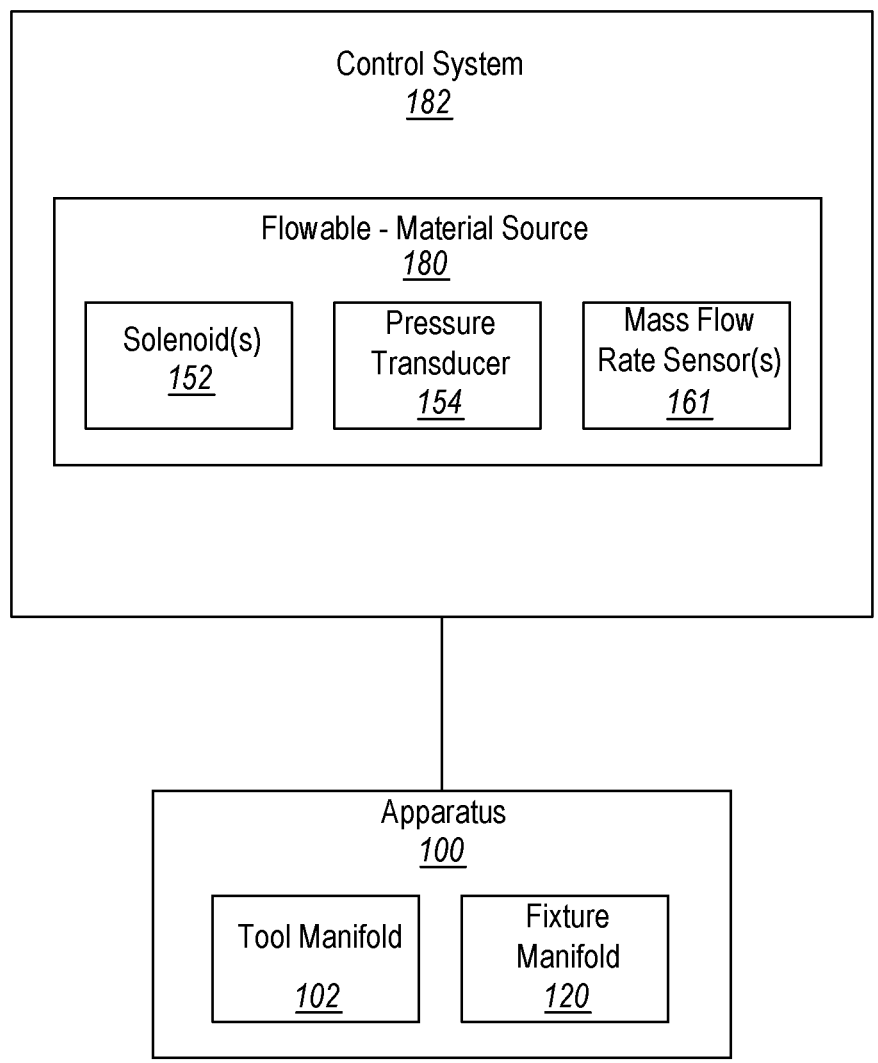
FIG. 7 is a schematic block diagram of a control system, according to one or more examples of the present disclosure.

In some examples, the system 200 further includes a control system 182. As shown in FIG. 7, the control system 182 is communicatively coupled with the at least one flowable-material source 180 to control the flow of flowable material supplied by the at least one flowable-material source 180 to the connected tool hoses 158 and to the tool manifold 102. The control and monitoring of the flowable-material source 180, through the control system 182, can be accomplished via operation of various devices of the flowable-material source 180, such as solenoids 152, pressure transducers 154, and mass flow rate sensors 161.

In some examples, the system 200 includes the solenoids 152, which are attached to corresponding ones of the tool hoses 150 or secondary tool hoses 150. The solenoids 152 can be operated to selectively turn on or off the flowable material to the connected tool hoses 150 or the secondary tool hose 150. The system 200 may also include the pressure transducers 154 and the mass flow rate sensors 161. Like the solenoids 152, the pressure transducers 154 and mass flow rate sensors 161 are attached to corresponding ones of the tool hoses 158 or secondary tool hoses 150. The pressure transducers 154 can be operated to monitor the vacuum level to a connected hose and the mass flow rate sensors 161 can be operated to monitor the air flow to a connected hose. In one example, a user can selectively control the solenoids 152, pressure transducers 154 and/or mass flow rate sensors 161 manually. Alternatively, or additionally, the control system 182 can further control the use of any solenoids 152, pressure transducers 154 and mass flow rate sensors 161 within the system 200. Accordingly, the control system 182 can be used to control the flow of flowable material to individual tool hoses within the system 200, without the need to individually connect or disconnect the tool hoses.

Figure 8:
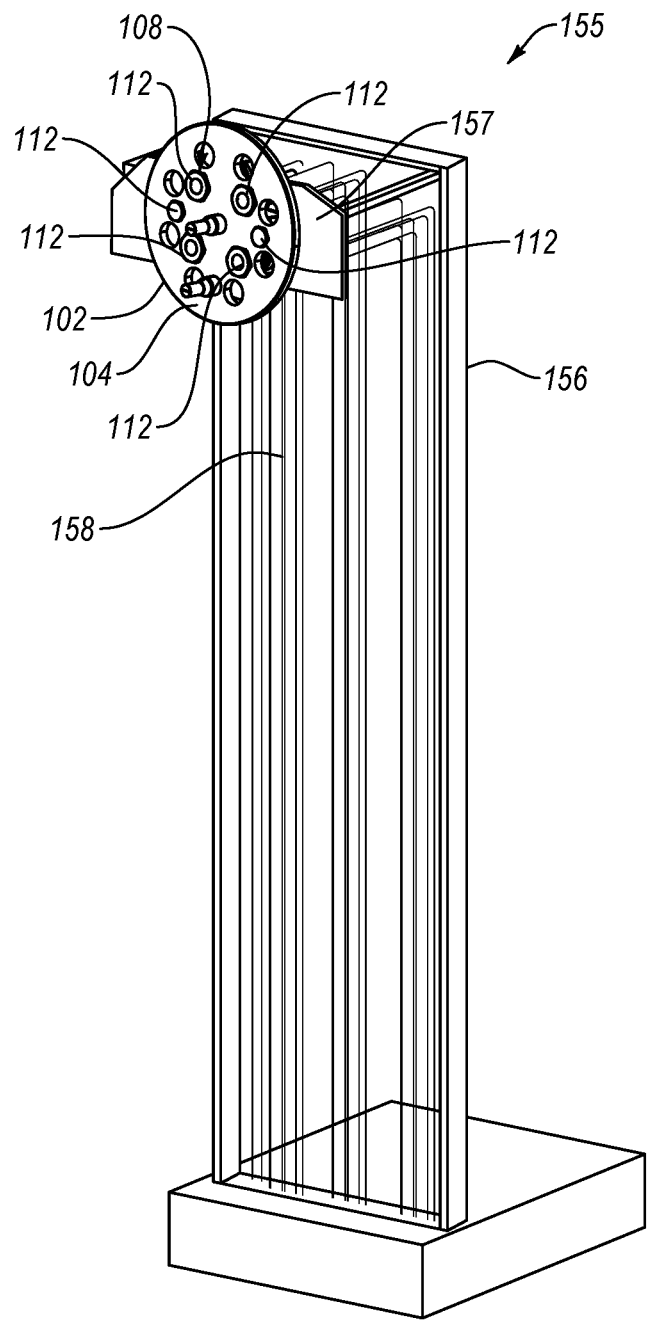
FIG. 8 is a schematic perspective view of a hose management system coupled with a tool manifold, according to one or more examples of the present disclosure.

In some examples, as shown in FIG. 8, the system 200 includes a hose management system 155. The hose management system 155 includes a hose management tool 156 that contains the plurality of tool hoses 158. More specifically, the hose management tool 156 organizes and houses the plurality of tool hoses 158. The tool manifold 102 is coupled to an upper end 157 of the hose management tool 156. The plurality of tool hoses 158 are connected to the hose end 110 of a corresponding one of the plurality of tool fittings 108 at the upper end 157 of the hose management tool 156, allowing any connected flowable-material source 180 to deliver flowable material through the plurality of tool hoses 158 to the tool manifold 102. In one example, the plurality of tool hoses 158 remain connected to the corresponding tool fittings 108 and the delivery of flowable material is controlled through the control system 182. In other examples, the plurality of tool hoses 158 can be individually connected and disconnected to the corresponding tool fittings 108 as needed to control which tool fittings 108 are connected for delivery of flowable materials.

Figure 9:
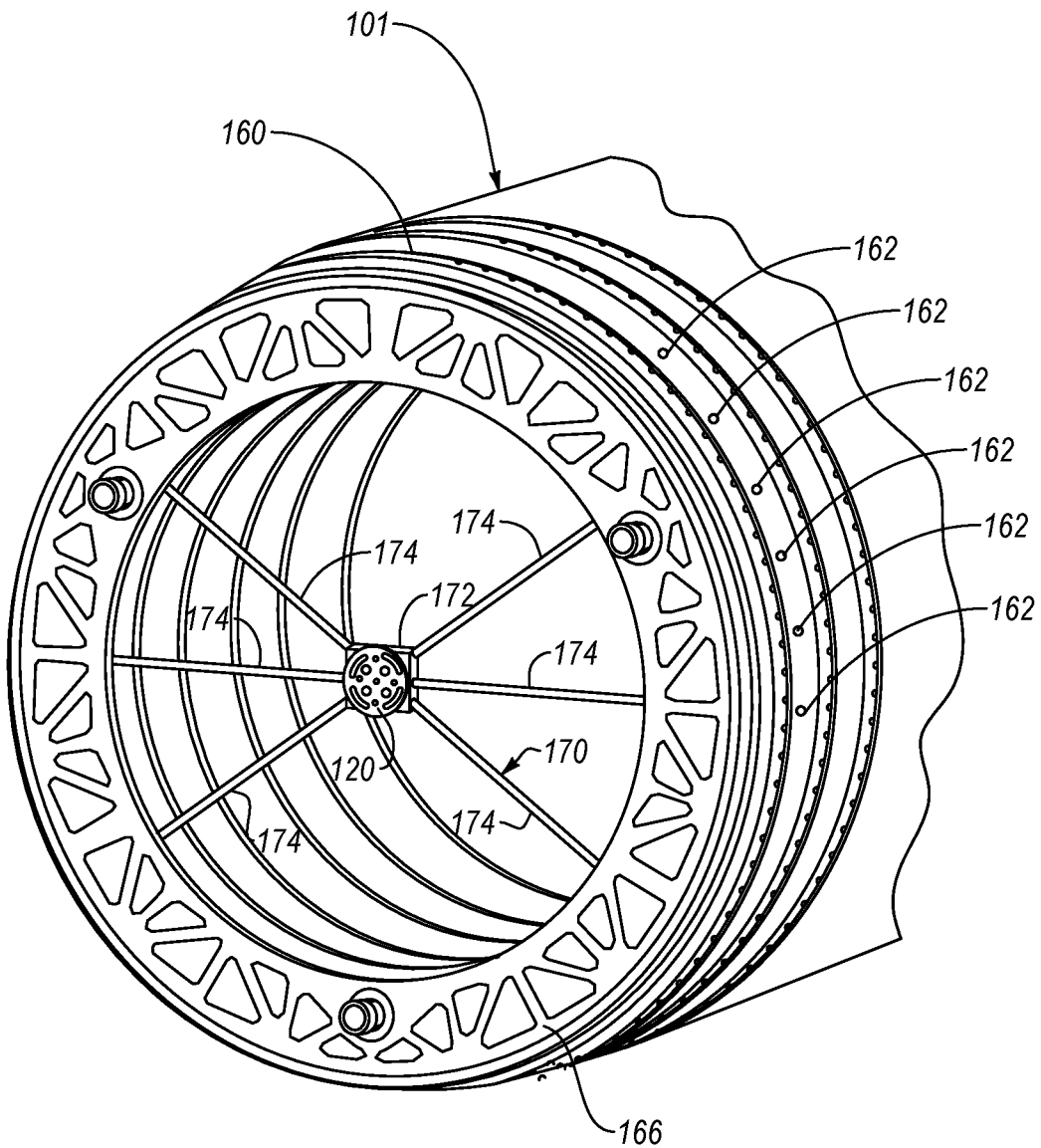
FIG. 9 is a schematic perspective view of a fixture manifold coupled to a fixture, according to one or more examples of the present disclosure.

In FIG. 9, according to some examples, a part-forming fixture 101 is shown. The part-forming fixture 101 can be any of various part-forming fixtures having any of various shapes and sizes. In one example, the part-forming fixture 101 is a mandrel that is used during a composite fuselage fabrication process. In some examples, the mandrel is divided into segments, such that only a segment or multiple segments of the mandrel are used during the fuselage fabrication process. In other examples, the part-forming fixture 101 could be a stiffener detail block fabrication tool, such as a male hat stringer or a 777x blade tool, a wing skin or empennage skin fabrication tool, or an IML empennage fabrication tool. The part-forming fixture 101 has a part-forming surface 160 and includes a plurality of ports 162. Each port 162 is configured to deliver flowable-material to a portion of the part-forming surface 160 of the part-forming fixture 101. The ports 162 may be capable of receiving multiple types of flowable-materials, such as hot air, pressurized air or depressurized air (e.g., a vacuum), or may be specialized for a specific type of flowable-material. The ports 162 may be located along an input end 166 of the part-forming fixture 101 and an output end 168 of the part-forming fixture 101. Accordingly, in some examples, the flowable-material can enter a port 162 at the input end 166 of the part-forming fixture 101 and exit a port 162 at the output end 168 of the part-forming fixture 101.

The fixture manifold 120 is coupled to the part-forming fixture 101. In one example, the fixture manifold 120 is coupled at the part-forming surface 160 of the part-forming fixture 101 at the input end 166 of the part-forming fixture 101. In other examples, the part-forming fixture 101 includes a tooling structure 170 fixed to the part-forming surface 160, at the input end 166 of the part-forming fixture 101 and the fixture manifold 120 is fixed to the tooling structure 170. For example, the tooling structure 170 can include a center panel 172 and the fixture manifold 120 can be fixed to the center panel 172. The tooling structure can further include a plurality of arms 174 that extend from the center panel 172 and are fixed to the part-forming surface 160. In some cases, the plurality of arms may be hollow and function to house the plurality of fixture hoses 164 that extend from the fixture manifold 120 to the corresponding port 162 on the part-forming fixture 101.

Figure 10A:
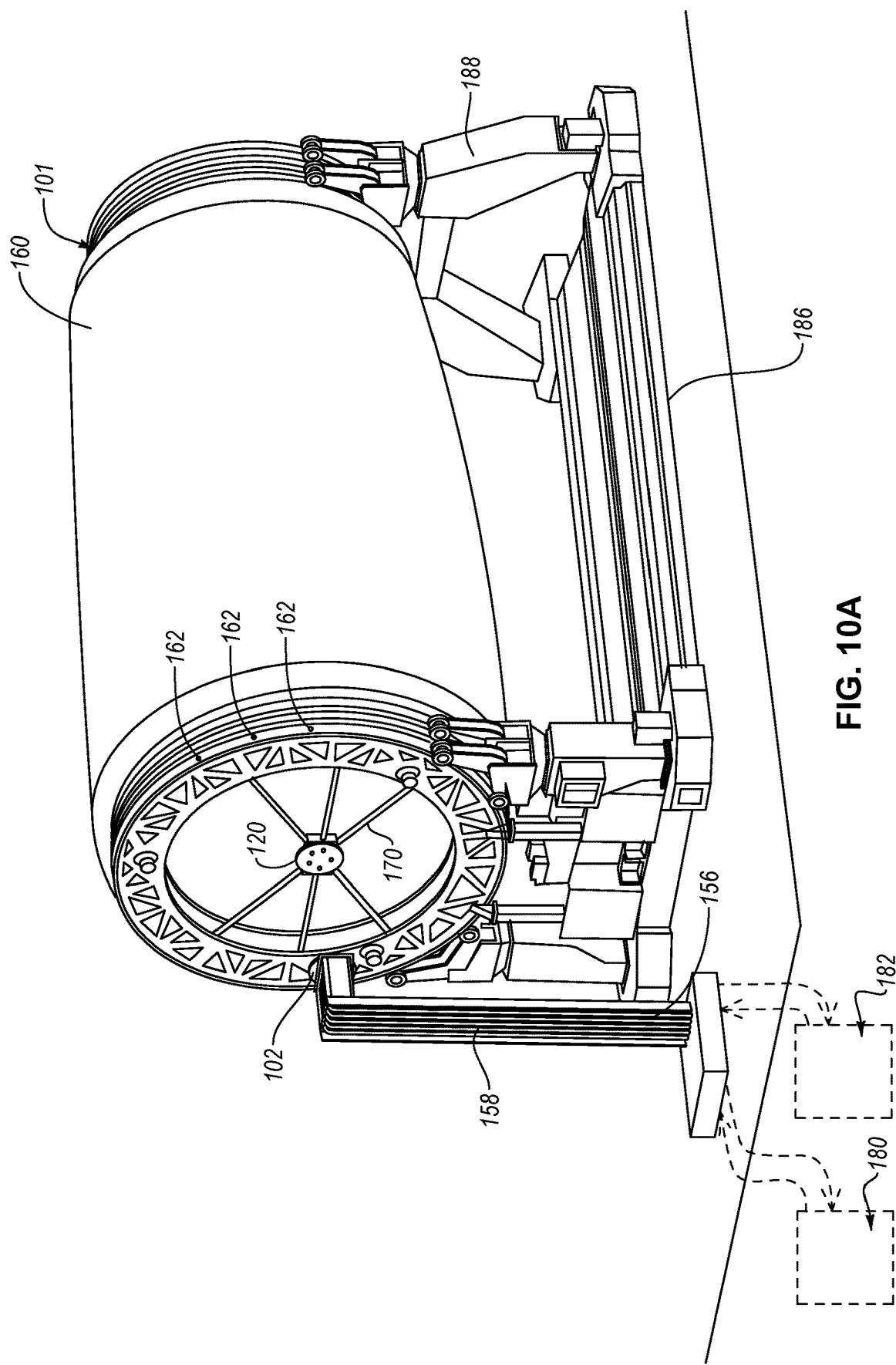
FIG. 10A is a schematic perspective view of a system for flowable material delivery to a fixture, where the tool manifold is separate from the fixture manifold, according to one or more examples of the present disclosure.
Figure 10B:
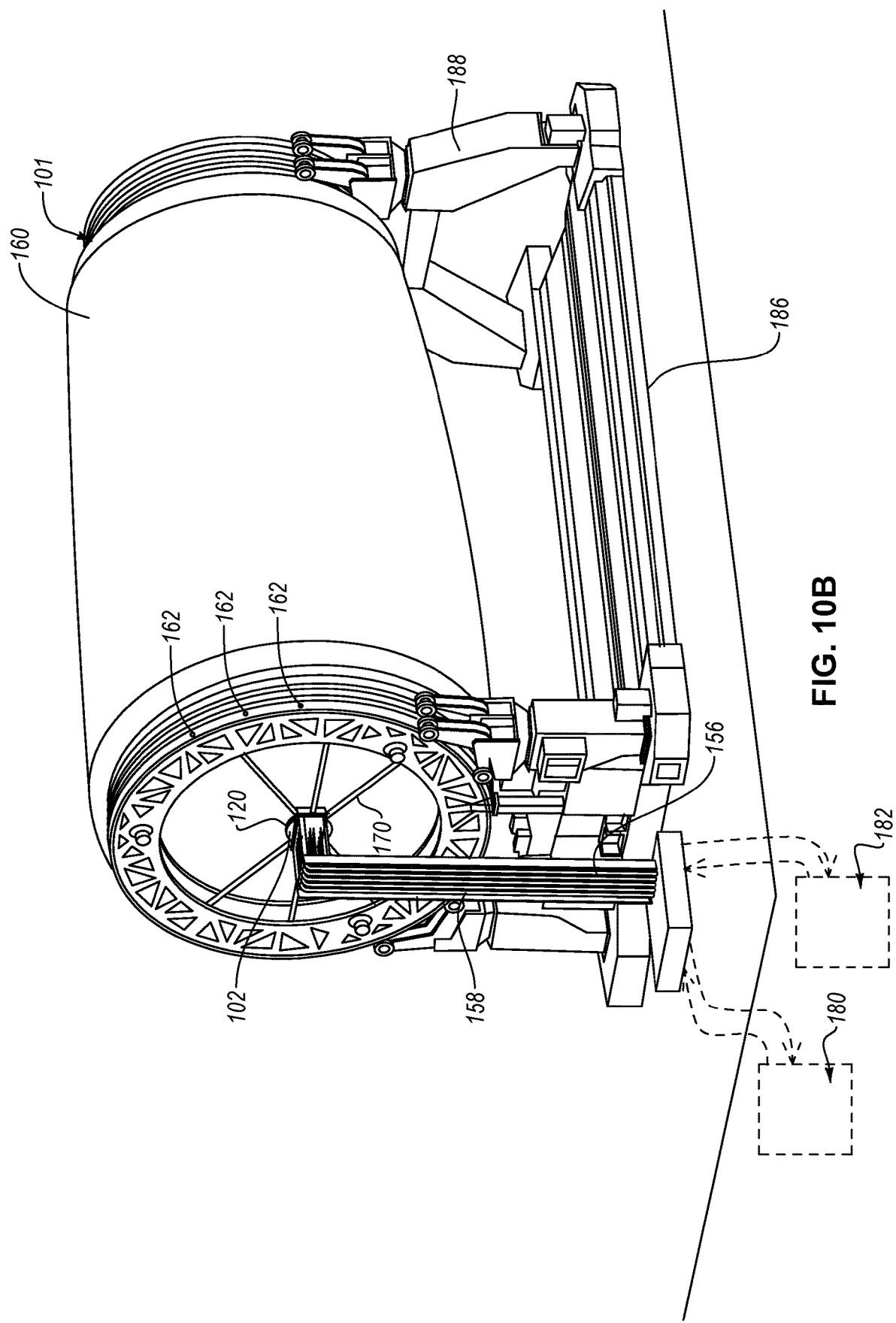
FIG. 10B is a schematic perspective view of the system of FIG. 10A, where the tool manifold is connected to the fixture manifold, according to one or more examples of the present disclosure.

Referring to FIGS. 10A and 10B, the part-forming fixture 101 is in a work cell 186, or an area where the part-forming fixture 101 is positioned during the part-forming process. The part-forming fixture 101 may be placed on a fixture frame 188, which elevates the part-forming fixture 101 from the ground without interfering with the part-forming surface 160. Generally, due to the size of the part-forming fixture 101, the part-forming fixture 101, although allowed to rotate, does not change its translational location while in the work cell 186. Therefore, in some examples, the hose management tool 156 is configured to be movable away and towards the part-forming fixture 101. In other words, the hose management tool 156 can be moved or stored away from the work cell 186 until it is needed, when it can be moved adjacent to the part-forming fixture 101 and the tool manifold 102 can be quickly connected to the fixture manifold 120. In some examples, rotation of the part-forming fixture 101 is necessary for a user to access, or to more comfortably access, portions of the part-forming surface 160. Accordingly, the part-forming fixture 101 can rotate, and the tool manifold 102 and fixture manifold 120, when coupled together, co-rotate while the part-forming fixture 101 is rotated.

In one example, the part-forming fixture 101 is loaded on the fixture frame 188 in the work cell 186 in order to perform fixture preparation work, such as leak checks at each of the ports 162 on the part-forming fixture 101. The hose management tool 156 is connected to the part-forming fixture 101 by interconnecting the tool manifold 102 to the fixture manifold 120, as shown in FIG. 10B. Accordingly, the flowable-material source 180, attached to the hose management tool 156, is connected to the ports 162 on the part-forming fixture 101 via the connected tool hoses 158 and fixture hoses 164. Tests for vacuum pressure, leak checks, vacuum decay checks, air flow, etc., can be performed on specific ports 162 on the part-forming fixture 101 with port-caps installed to ports 162 on the part-forming fixture 101 that are not being tested at that time. The part-forming fixture 101 can be rotated as needed to access the specific ports 162 for testing. By interconnecting the tool manifold 102 to the fixture manifold 120, it is possible to test each port 162 on the part-forming fixture 101, without the need to connect and disconnect hoses manually from the ports 162. Additionally, the control system 182 can be operated to measure, monitor, report, and control the flow of flowable-material to individual tool hoses, etc., during any fixture preparation work.

In another example, the part-forming fixture 101 is in the work cell 186 in order to perform the part forming process. The materials for the part, or a section of the part, are manually applied to the part-forming surface 160. Vacuum pressure is required for forming and compacting the materials, therefore a vacuum bag is applied over the vacuum-requiring part or section of the part, and a vacuum is applied to the ports 162 on the fixture that correlate with the part or section of the part. The control system 182 can be operated to monitor the vacuum level and duration of the vacuum. In some examples, sections of the part-forming fixture 101 can be maintained under vacuum while other work is performed on the part-forming fixture 101. The control system 182 can be used to deliver vacuum to all of the fixture 101 at once or to sections of the part-forming fixture 101 as needed. The control system 182 can also be used to perform leak checks during the part-forming process. Additionally, the control system 182 can be used to maintain vacuum on seams if the fixture has segmented sections.

Figure 11A:
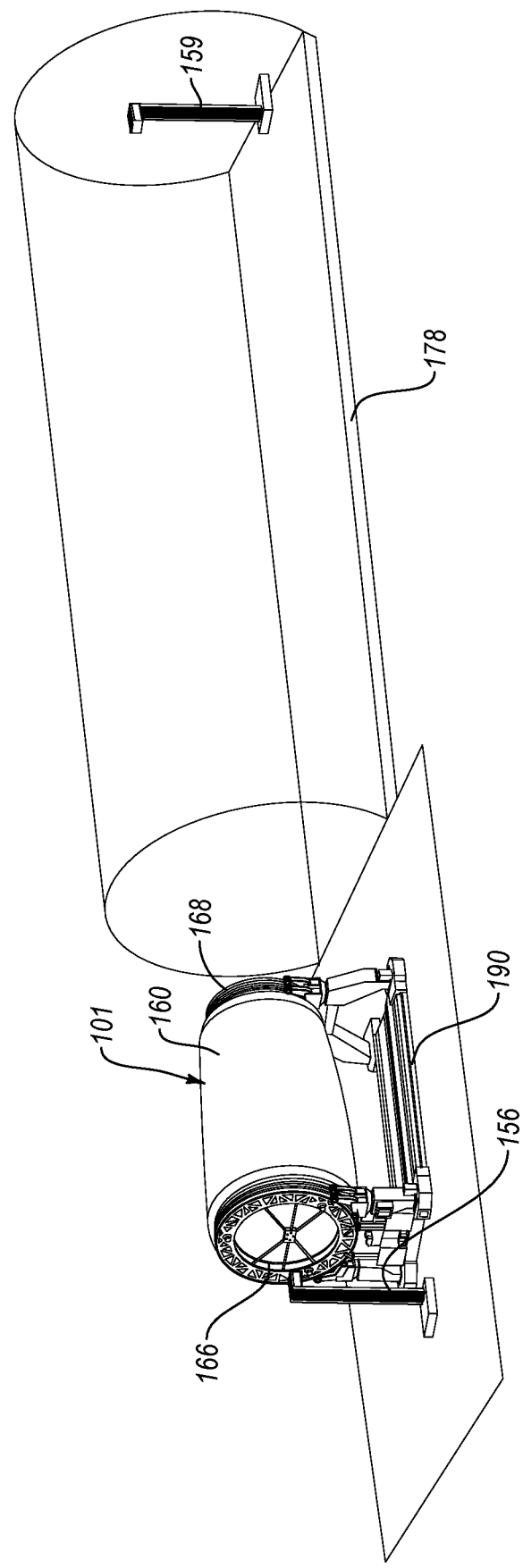
FIG. 11A is a schematic perspective view of a system for flowable material delivery to a fixture, the fixture adjacent to an autoclave, according to one or more examples of the present disclosure.
Figure 11B:
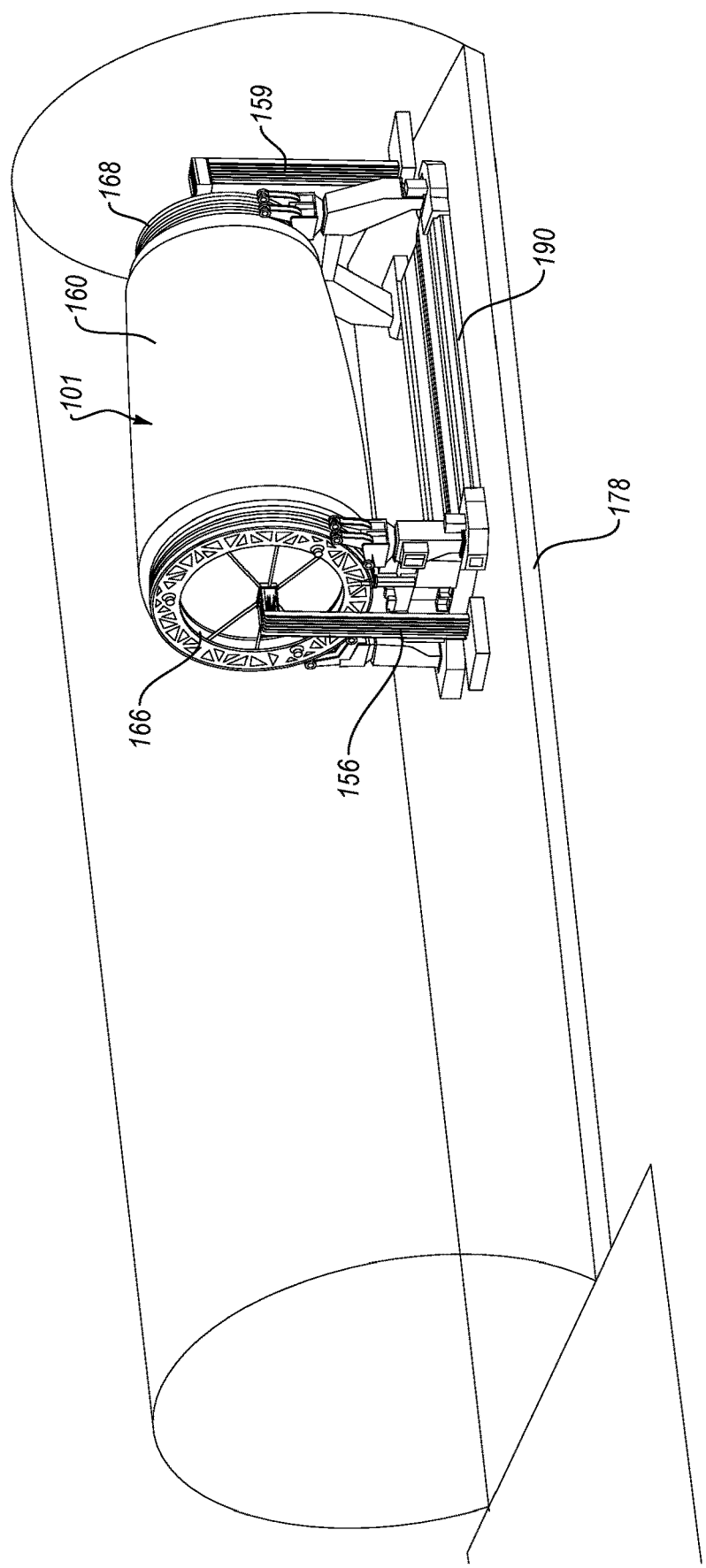
FIG. 11B is a schematic perspective view of the system of FIG. 11A, where the fixture is within the autoclave, according to one or more examples of the present disclosure.

As shown in FIGS. 11A and 11B, the system 200 can be used within an autoclave 178, for example, the system 200 can be used in the autoclave 178 during a composite-material curing process. Prior to moving the part-forming fixture 101 within the autoclave 178, the tool manifold 102, if connected, is disconnected from the fixture manifold 120 and the hose management tool 156 is positioned away from the part-forming fixture 101 to prevent any damage or collision to the part-forming fixture 101 or hose management tool 156. In some examples, the part-forming fixture 101 can be loaded onto an autoclave cart 190, which does not interfere with the part-forming surface 160, and moved into the autoclave 178. The part-forming fixture 101 remains on the autoclave cart 190 during the autoclave process. In some examples, multiple fixtures 101 can be moved within the autoclave 178 during the same autoclave process, with each fixture 101 having an attached fixture manifold 120 and corresponding tool manifold 102.

The hose management tool 156 is moved adjacent to the fixture manifold 120 within the autoclave 178 and the tool manifold 102 is coupled to the fixture manifold 120. The fixture manifold 120 is connected to an input end 166 of the part-forming fixture 101. In some examples, the hose management tool 156 is separate from the autoclave 178 and positioned within the autoclave 178 for the autoclave process. In other examples, the hose management tool 156 is connected within the autoclave 178, such as being connected to an autoclave wall and having the tool manifold 102 pivotable towards and away from the fixture manifold 120. In other words, the same hose management tool 156 can be used for both the work cell 186 and the autoclave 178, or one hose management tool 156 can be used in the work cell 186 and another hose management tool 156 can be used within the autoclave 178.

In some examples, an output tool 159 is positioned adjacent to an output end 168 of the part-forming fixture 101, the output end 168 spaced apart from the input end 166 of the part-forming fixture 101. The input end 166 and output end 168 each have ports 162 along the surface on the part-forming fixture 101. The ports 162 on the input end 166 configured to receive a flowable material and the ports 162 on the output end 168 configured to allow the flowable material to exit the part-forming fixture 101. A tool manifold 102 is coupled to the output tool 159 and is removably attachable to a fixture manifold 120 coupled to the output end 168 of the part-forming fixture 101.

Generally, the part-forming fixture 101 does not require rotation while in the autoclave 178. Accordingly, the tool manifold 102, which is non-rotating in some examples as shown in FIG. 1, can be coupled with the hose management tool 156 and connected to the fixture manifold 120 on the part-forming fixture 101. In other examples, the rotating tool manifold 102, as shown in FIG. 4, can alternatively be coupled with the hose management tool 156 and connected to the fixture manifold 120 on the part-forming fixture 101, however, the tool manifold 102 will not be rotated during the autoclave process.

Figure 12:
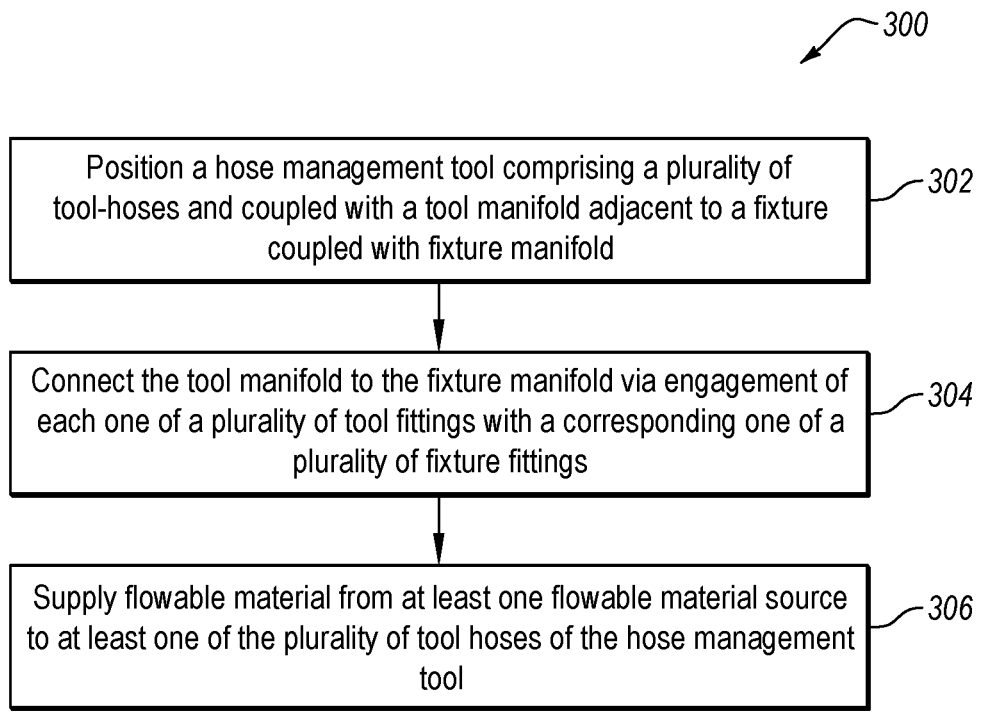
FIG. 12 is a schematic flow diagram of a method of providing flowable material to a part-forming fixture, according to one or more examples of the present disclosure.

Now referring to FIG. 12, one example of a method 300 is shown. The method 300 includes (block 302) positioning a hose management tool 156 including a plurality of tool hoses 158 and coupled with a tool manifold 102 adjacent to a fixture manifold 120 coupled to a fixture 101. The tool manifold 102 including a plurality of tool fittings 108 and at least one of the plurality of tool hoses 158 removably attached to a corresponding one of the plurality of tool fittings 108. The fixture manifold 120 includes a plurality of fixture fittings 126 and each one of a plurality of fixture hoses 164 connected to one of the plurality of fixture fittings 126 and to a corresponding one of a plurality of ports 162 on the part-forming fixture 101. The method 300 also includes (block 304) connecting the tool manifold 102 to the fixture manifold 120 via engagement of each one of the plurality of tool fitting 108 with a corresponding one of the plurality of fixture fittings 126 such that a seal is created between each tool fitting 108 and the corresponding fixture fitting 126. The method 300 further includes (block 306) supplying flowable material from at least one flowable-material source 180 to the at least one of the plurality of tool hoses 158 of the hose management tool 156.

In some examples, the method 300 further includes clamping together the tool manifold 102 and the fixture manifold 120, after connecting the tool manifold 102 and the fixture manifold 120. A clamping mechanism 140 clamps together the tool manifold 102 with the fixture manifold 120, so they do not separate while flowable material is being supplied to the part-forming fixture 101.

The method 300 can be used to test the part-forming fixture 101 prior to forming a part on the part-forming fixture 101. A vacuum test can performed on each port 162 of the plurality of ports 162 along at least a portion of the part-forming fixture 101. In some examples, the vacuum test can be performed on every port 162 on the part-forming fixture 101. After performing the vacuum test, materials can be applied to at least the portion of the part-forming fixture 101 where the ports 162 were tested. In some examples, the vacuum test can be performed on ports 162 during the part-forming process to ensure the ports are receiving or capable of receiving the necessary vacuum quality.

In some examples, the method 300 is performed on a fixture 101 that is in a work cell 186. In other examples, the method 300 is performed on a fixture 101 that is in an autoclave 178. For example, after applying materials to at least a portion of the part-forming fixture 101, the part-forming fixture 101 is moved into an autoclave 178. The hose management tool 156A is positioned adjacent to an input end 166 of the fixture and, in some cases, an output tool 156B is positioned adjacent to an output end of the part-forming fixture 101. The tool manifold 102 is connected to the fixture manifold 120 at the input end 166 of the fixture and the output tool 156B is connected to the fixture manifold 120 coupled to the output end 168 of the part-forming fixture 101. Hot air is supplied from the at least one flowable-material source 180 to heat the materials on at least a portion of the part-forming fixture 101, the hot air flowing from the at least one flowable-material source 180, through the part-forming fixture 101 and exiting from the output tool 156B.

Figure 13:
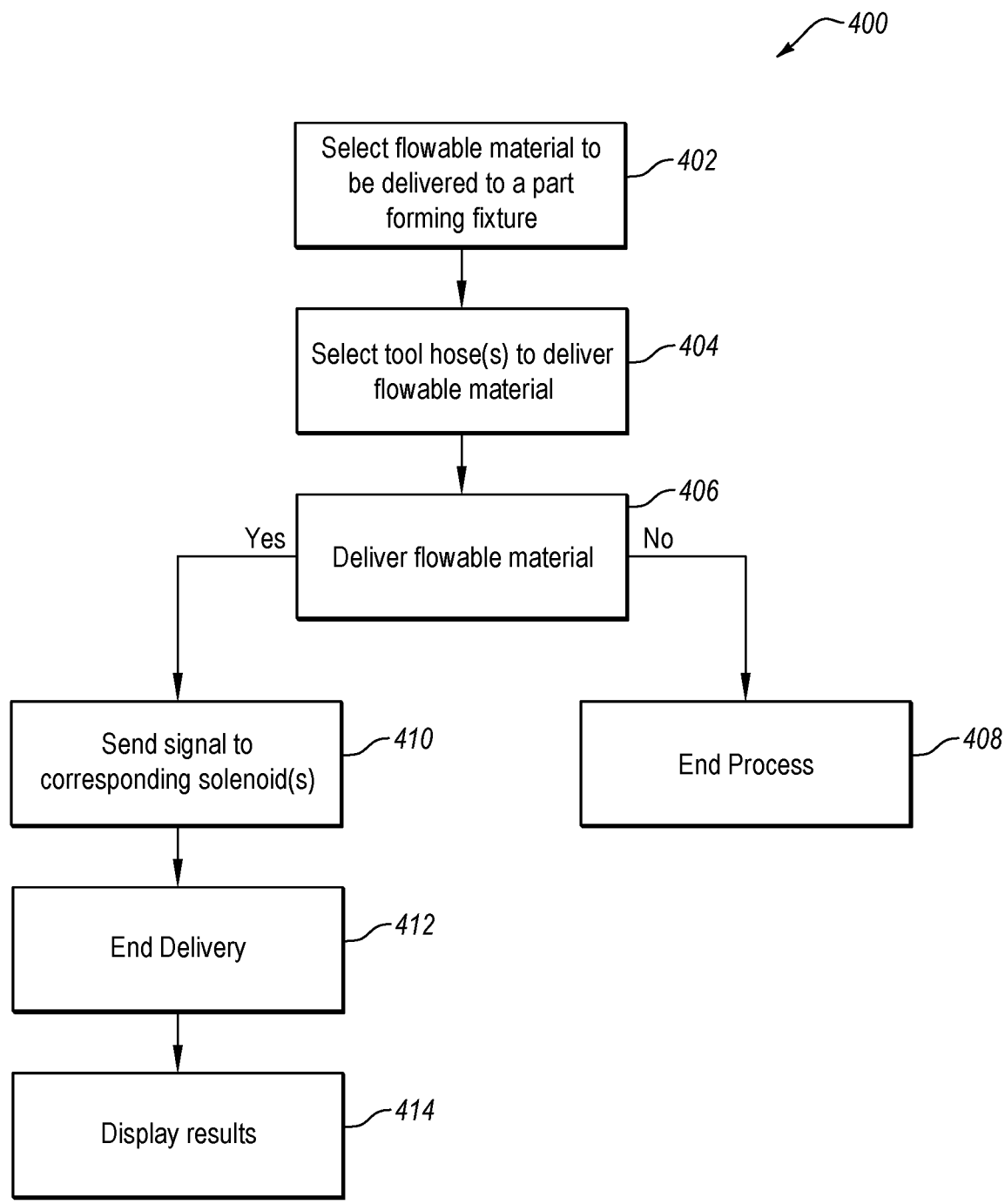
FIG. 13 is a schematic flow diagram of a method of delivering flowable material to a part-forming fixture, according to one or more examples of the present disclosure.
Figure 14:
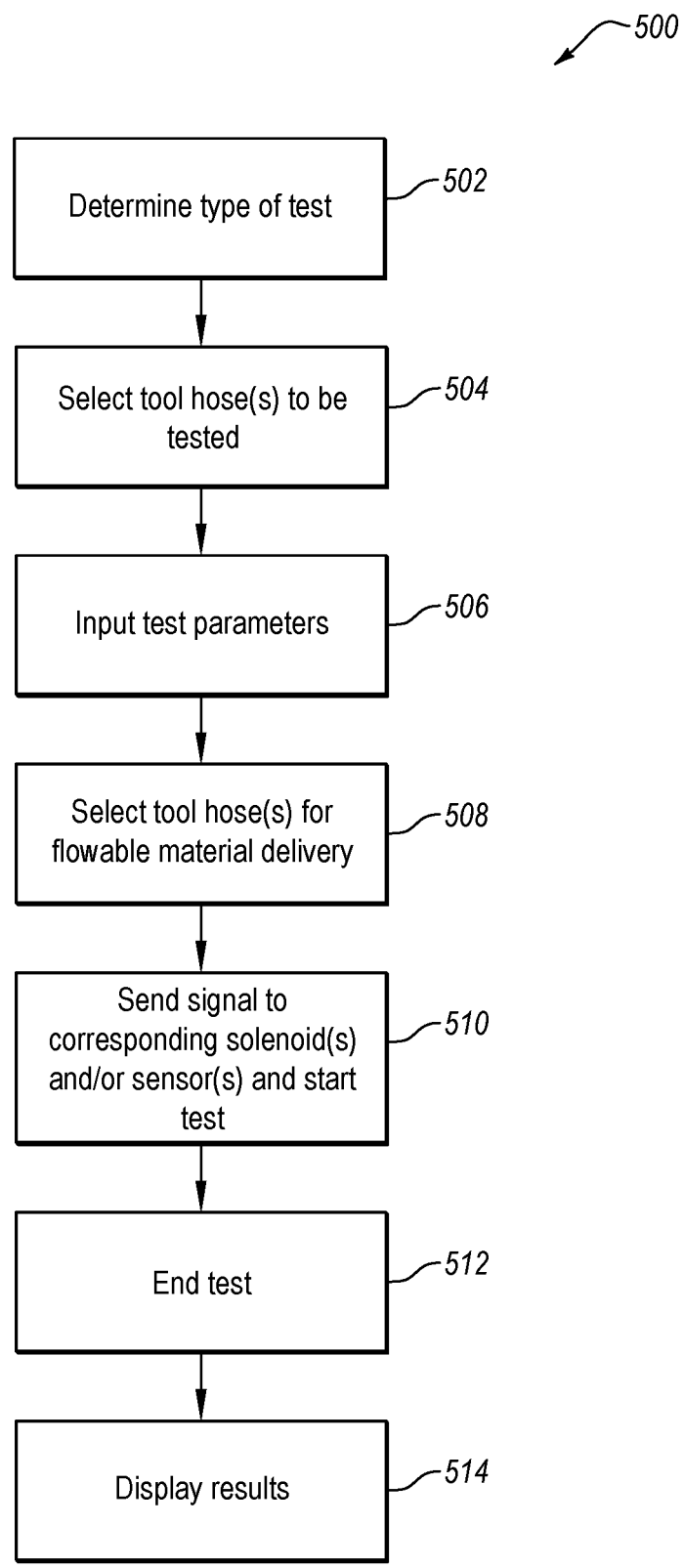
FIG. 14 is a schematic flow diagram of a method of testing selected hoses connected to a part-forming fixture, according to one or more examples of the present disclosure.

In some examples, the flowable material supplied from the flowable-material source 180 is controlled by a control system 182 that is communicatively coupled with the flowable-material source 180, such as in the methods shown in FIGS. 13 and 14.

Referring to FIG. 13, one example of a method 400 is shown for the process of delivering flowable material to a part-forming fixture 101 using a control system 182 that is communicatively coupled with at least one flowable-material source 180. The method 400 includes (block 402) using the control system 182 to select at least one flowable-material source 180 to be delivered to a part-forming fixture 101. The method 400 also includes (block 404) using the control system 182 to select the tool hose(s) to deliver the at least one flowable-material source 180. The method further includes (block 406) determining whether to deliver the at least one flowable material. If a user and/or the control system 182 determines not to deliver the at least one flowable material 180 the process is ended (block 408). Alternatively, if a user and/or the control system 182 determines to deliver the at least one flowable material 180, the control system 182 sends a signal to the solenoid(s) 152 that corresponds to the selected tool hose(s) 158 (block 410). The signal sent to the corresponding solenoid(s) 152 selectively turns on the solenoid(s) 152, such that flowable material from the at least one flowable-material source 180 can flow to the plurality of tool fittings 108. The method 400 also includes (block 412) ending the delivery of the at least one flowable-material source 180 using the control system 182. After the delivery is ended, the method 400 may further include (block 414) displaying the results of the delivery of the at least one flowable-material source 180 to the part-forming fixture 101. The results can be displayed on the control system 182 or a connected device, such as a computer communicatively connected to the control system 182. Results may include but are not limited to the state of the solenoid(s) 152, the state of the at least one flowable material 180, and/or the state of the tool hose(s) 158.

Now referring to FIG. 14, one example of a method 500 is shown for the process of testing the system 200 for providing flowable material to a part-forming fixture 101. The method 500 includes (block 502) determining the type of test to be performed on the system 200. In one example, the test may be a vacuum decay test of the flowable-material source 180. In other examples, the type may be a test to determine and measure the flow rate of the at least one flowable-material source 180. Other tests could also be performed on the system 200. The method 500 also includes (block 504) using the control system 182 to select the tool hose(s) 158 to be tested. The method 500 further includes (block 506) inputting test parameters using the control system 182 or devices communicatively connected to the control system 182. Test parameters may include but are not limited to time duration of the test, minimum starting vacuum level, etc. The method 500 also includes (block 508) using the control system 182 to select the tool hose(s) to deliver the at least one flowable-material source 180, such as the depressurized air (e.g., vacuum). The method 500 further includes (block 510) using the control system 182 to send a signal to the solenoid(s) 152 that correspond to the selected tool hose(s) 158. The signal sent to the corresponding solenoid(s) 152 selectively turns on the solenoid(s) 152, such that the vacuum or other flowable material can flow to or from the plurality of tool fittings 108. The method 500 includes (block 512) ending the test performed on the system 200 using the control system 182. After the test is ended, the method 500 may further include (block 5014) displaying the results of the test. Results may include but are not limited to the vacuum decay rate at each selected tool hose 158, the vacuum flow rate at each selected tool hose 158, etc.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An apparatus for providing flowable material to a part-forming fixture, the apparatus comprising:
    a tool manifold, comprising:
        a tool-manifold base comprising a tool surface and a fixture-interface surface, opposite the tool surface; and
        a plurality of tool fittings extending through the tool-manifold base and each comprising a hose end, extending from the tool surface, and an interface end, extending from the fixture-interface surface;
    a fixture manifold comprising:
        a fixture-manifold base comprising a fixture surface and a tool-interface surface, opposite the fixture surface; and
        a plurality of fixture fittings extending through the fixture-manifold base and each comprising a hose end, extending from the fixture surface and an interface end, extending from the tool-interface surface; and
    a rotary union comprising a plurality of outlet ports and a plurality of inlet ports, wherein:
        the interface end of each one of the plurality of tool fittings is removably attachable to the interface end of a corresponding one of the plurality of fixture fittings such that, when attached, a seal is created between the tool fitting and the corresponding fixture fitting and flowable material is flowable from each one of the tool fittings into the corresponding one of the fixture fittings;
        the plurality of outlet ports are rotatable relative to the plurality of inlet ports;
        the plurality of outlet ports are fluidically coupled with the plurality of tool fittings;
        the tool-manifold base is co-rotatable relative to the plurality of outlet ports and rotatable relative to the plurality of inlet ports; and
        when the interface end of each one the plurality of tool fittings is attached to the interface end of the corresponding one of the plurality of fixture fittings, the tool manifold and the fixture manifold are co-rotatable.

2. The apparatus of claim 1, further comprising a hose management tool coupled with the tool manifold and comprising a plurality of tool hoses, wherein each tool hose of the plurality of tool hoses of the hose management tool is configured to be removably attachable to the hose end of a corresponding one of the plurality of tool fittings.

3. The apparatus of claim 1, wherein the tool manifold further comprises:
    a rotatable drum attached to the tool surface of the tool-manifold base, such that the rotatable drum is rotatable relative to the inlet ports of the rotary union but co-rotatable with the outlet ports of the rotary union; and
    a plurality of secondary tool hoses connecting the plurality of outlet ports of the rotary union to the hose end of a corresponding one of the plurality of tool fittings, wherein, when the interface end of each one the plurality of tool fittings is attached to the interface end of the corresponding one of the plurality of fixture fittings, the rotatable drum and the fixture manifold are co-rotatable.

4. The apparatus of claim 1, wherein the part-forming fixture comprises a plurality of ports and the hose end of each one of the plurality of fixture fittings is configured to be removably attachable to a corresponding one of the plurality of ports via a fixture hose.

5. The apparatus of claim 1, further comprising a clamping mechanism configured to selectively secure the tool manifold and the fixture manifold together after the interface end of each one of the plurality of tool fittings is attached to the interface end of the corresponding one of the plurality of fixture fittings.

6. The apparatus of claim 1, wherein the tool manifold comprises first alignment guides and the fixture manifold comprises second alignment guides, the first alignment guides and second alignment guides configured to aid in the alignment of the interface end of each one of the plurality of tool fittings to the interface end of a corresponding one of the plurality of fixture fittings.

7. A system for providing flowable material to a part-forming fixture, the system comprising:
    a tool manifold, comprising:
        a tool-manifold base comprising a tool surface and a fixture-interface surface, opposite the tool surface; and
        a plurality of tool fittings extending through the tool-manifold base and each comprising a hose end, extending from the tool surface, and an interface end, extending from the fixture-interface surface;
    a hose management tool comprising a plurality of tool hoses and the tool manifold coupled to the hose management tool, wherein the hose end of each one of the plurality of tool fittings is configured to be removably attachable to a corresponding one of the plurality of tool hoses of the hose management tool;
    a fixture manifold comprising:
        a fixture-manifold base comprising a fixture surface and a tool-interface surface, opposite the fixture surface; and
        a plurality of fixture fittings extending through the fixture-manifold base and each comprising a hose end, extending from the fixture surface and an interface end, extending from the tool-interface surface;
    a fixture comprising a plurality of ports, the fixture manifold coupled to the fixture, wherein the hose end of each one of the plurality of fixture fittings is configured to be removably attachable to a corresponding one of the plurality of ports via one of a plurality of fixture hoses;

at least one flowable-material source removably attachable to the plurality of tool hoses and configured to provide flowable material to the plurality of tool hoses; and a control system communicatively coupled with the at least one flowable-material source to control the flow of the at least one flowable-material source, wherein:
the interface end of each one of plurality of tool fittings is removably attachable to the interface end of a corresponding one of the plurality of fixture fittings such that, when attached, a seal is created between the tool fitting and the corresponding fixture fitting and the at least one flowable-material source is configured to supply flowable material from at least one of the plurality of tool hoses to at least one of the plurality of ports; and the hose management tool and the tool manifold are movable relative to the fixture manifold.

8. The system of claim 7, further comprising a solenoid configured to selectively turn on or off the flowable material from the at least one flowable-material source to one of the plurality of tool fittings, wherein the control system is configured to selectively turn the solenoid on or off.

9. The system of claim 7, wherein:
the at least one flowable-material source is a vacuum device; and
the system further comprises a pressure transducer configured to measure the vacuum level at one of the plurality of tool fittings, wherein the control system is configured to receive and monitor the vacuum level measured by the pressure transducer.

10. The system of claim 7, further comprising a mass flow rate sensor configured to measure the mass flow rate to one of the plurality of tool fittings, wherein the control system is configured to receive and monitor the mass flow rate measured by the mass flow rate sensor.

11. The system of claim 7, wherein:
the part-forming fixture comprises a part-forming surface and a tooling structure;
the tooling structure comprises a center panel and a plurality of arms, the plurality of arms extend from the center panel and are fixed to the part-forming surface; and
the fixture manifold is fixed to the center panel of the tooling structure.

12. The system of claim 11, wherein:
the plurality of arms comprises a hollow opening; and
each one of the plurality of fixture hoses extend from the hose end of the fixture fittings and through one of the plurality of arms to a corresponding one of the plurality of ports on the fixture.

13. The system of claim 7, wherein:
the fixture is rotatable; and
the tool manifold and the fixture manifold, when coupled together, co-rotate as the fixture is rotated.

14. The apparatus of claim 1, wherein, when the interface end of each one of the plurality of tool fittings is removably attached to the interface end of the corresponding one of the plurality of fixture fittings, the fixture-interface surface of the tool-manifold base and the tool-interface surface of the fixture-manifold base face each other.

15. The apparatus of claim 1, wherein, when the interface end of each one of the plurality of tool fittings is removably attached to the interface end of the corresponding one of the plurality of fixture fittings, the fixture-interface surface of the tool-manifold base and the tool-interface surface of the fixture-manifold base are parallel to and spaced apart from each other.

16. The apparatus of claim 15, wherein, when the interface end of each one of the plurality of tool fittings is removably attached to the interface end of the corresponding one of the plurality of fixture fittings, at least one of the plurality of tool fittings or the plurality of fixture fittings is located within a gap defined between the fixture-interface surface of the tool-manifold base and the tool-interface surface of the fixture-manifold base.

17. The apparatus of claim 1, wherein each one of the plurality of tool fittings is co-axial with a corresponding one of the plurality of fixture fittings.

18. The system of claim 7, wherein, when the interface end of each one of the plurality of tool fittings is removably attached to the interface end of the corresponding one of the plurality of fixture fittings, the fixture-interface surface of the tool-manifold base and the tool-interface surface of the fixture-manifold base face each other.

19. The system of claim 7, wherein each one of the plurality of tool fittings is co-axial with a corresponding one of the plurality of fixture fittings.

20. A system for providing flowable material to a part-forming fixture, the system comprising:
a tool manifold, comprising:
a tool-manifold base comprising a tool surface and a fixture-interface surface, opposite the tool surface; and
a plurality of tool fittings extending through the tool-manifold base and each comprising a hose end, extending from the tool surface, and an interface end, extending from the fixture-interface surface;

a hose management tool comprising a plurality of tool hoses and the tool manifold coupled to the hose management tool, wherein the hose end of each one of the plurality of tool fittings is configured to be removably attachable to a corresponding one of the plurality of tool hoses of the hose management tool;

a fixture manifold comprising:
a fixture-manifold base comprising a fixture surface and a tool-interface surface, opposite the fixture surface; and
a plurality of fixture fittings extending through the fixture-manifold base and each comprising a hose end, extending from the fixture surface and an interface end, extending from the tool-interface surface;

a fixture comprising a plurality of ports, the fixture manifold coupled to the fixture, wherein the hose end of each one of the plurality of fixture fittings is configured to be removably attachable to a corresponding one of the plurality of ports via one of a plurality of fixture hoses;

at least one flowable-material source removably attachable to the plurality of tool hoses and configured to provide flowable material to the plurality of tool hoses; and a control system communicatively coupled with the at least one flowable-material source to control the flow of the at least one flowable-material source, wherein:
the interface end of each one of plurality of tool fittings is removably attachable to the interface end of a corresponding one of the plurality of fixture fittings such that, when attached, a seal is created between the tool fitting and the corresponding fixture fitting and the at least one flowable-material source is configured to supply flowable material from at least one of the plurality of tool hoses to at least one of the plurality of ports;
the fixture is rotatable; and
the tool manifold and the fixture manifold, when coupled together, co-rotate as the fixture is rotated.

* * * * *